United States Patent
Kobayashi

(10) Patent No.: US 7,520,617 B2
(45) Date of Patent: Apr. 21, 2009

(54) REFLECTION TYPE PROJECTION DISPLAY APPARATUS

(75) Inventor: Manabu Kobayashi, Saitama (JP)

(73) Assignee: Victor Company of Japan, Ltd., Yokohama (JP)

( * ) Notice: Subject to any disclaimer, the term of this patent is extended or adjusted under 35 U.S.C. 154(b) by 407 days.

(21) Appl. No.: 11/347,298

(22) Filed: Feb. 6, 2006

(65) Prior Publication Data
US 2006/0197915 A1 Sep. 7, 2006

(30) Foreign Application Priority Data
Mar. 4, 2005 (JP) ............... 2005-061302
Oct. 21, 2005 (JP) ............... 2005-307355

(51) Int. Cl.
G03B 21/14 (2006.01)
G03B 21/00 (2006.01)
(52) U.S. Cl. ......................... 353/20; 353/31
(58) Field of Classification Search ................... 353/20, 353/22, 23, 24, 31, 33, 34, 81, 98; 359/833, 359/834, 490, 494, 497, 502; 349/9, 54; 348/750, 758
See application file for complete search history.

(56) References Cited
U.S. PATENT DOCUMENTS 3,631,288 A * 12/1971 Rogers ................... 313/111
6,457,829 B1 * 10/2002 Nakazawa et al. ........... 353/31
2004/0109143 A1 * 6/2004 Imahase et al. ............ 353/31
2004/0212748 A1 * 10/2004 Suzuki et al. ............... 349/8

FOREIGN PATENT DOCUMENTS

JP 03-216638 9/1991
JP 08-201756 8/1996
JP 2000-155372 6/2000

* cited by examiner

Primary Examiner—Hung Henry Nguyen
(74) Attorney, Agent, or Firm—The Nath Law Group; Jerald L. Meyer; Sungyeop Chung

(57) ABSTRACT

One of preferred embodiments according to the present invention provides a reflection type projection apparatus that includes wire grid polarizers provided respectively for red (R), green (G) and blue (B) light that allow a first polarization component included in R, G, or B light from illumination units to pass therethrough and reflect second polarization components of R, G and B colors that have been produced when reflection type spatial light modulation elements respectively for R, G and B light light-modulate and reflect the first polarization component having once passed through the wire grid polarizers respectively for R, G and B light, the transmission type polarizing plates provided respectively for R, G and B light, and a color combination optical system in this order along a light path, wherein any one of the light reflection surface of at least one of the wire grid polarizers respectively for R, G and B light, the light transmission surface of at least one of the transmission type polarizing plates for R, G and B light, and at least one of the light incident surfaces of the color combination optical system is convexly or concavely shaped in accordance with lateral chromatic aberration of the projection lens, in order to correct for the reduction of lateral chromatic aberration of the image projected on a projection plane.

4 Claims, 39 Drawing Sheets

PRE-CORRECTION MAGNIFICATION CHROMATIC
ABERRATION CHARACTERISTIC 1A ON A SCREEN

POST-CORRECTION MAGNIFICATION CHROMATIC
ABERRATION CHARACTERISTIC 1B ON A SCREEN

PRE-CORRECTION MAGNIFICATION CHROMATIC
ABERRATION CHARACTERISTIC 2A ON A SCREEN

POST-CORRECTION MAGNIFICATION CHROMATIC
ABERRATION CHARACTERISTIC 2B ON A SCREEN

CONVEX SURFACE
(LIGHT REFLECTION SURFACE)

CONCAVE SURFACE
(LIGHT REFLECTION SURFACE)

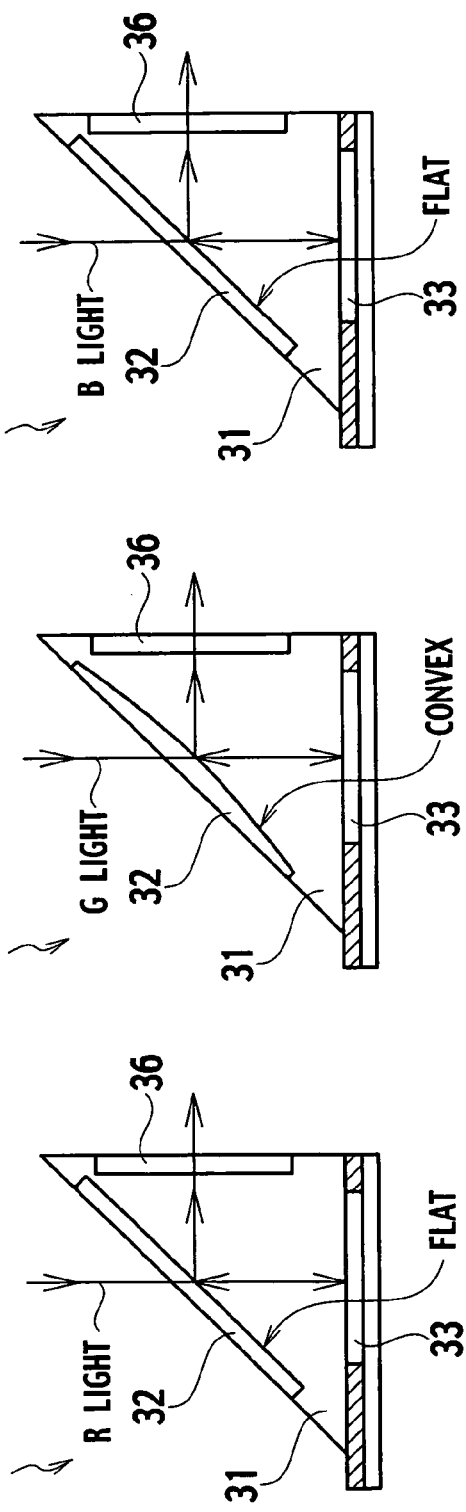

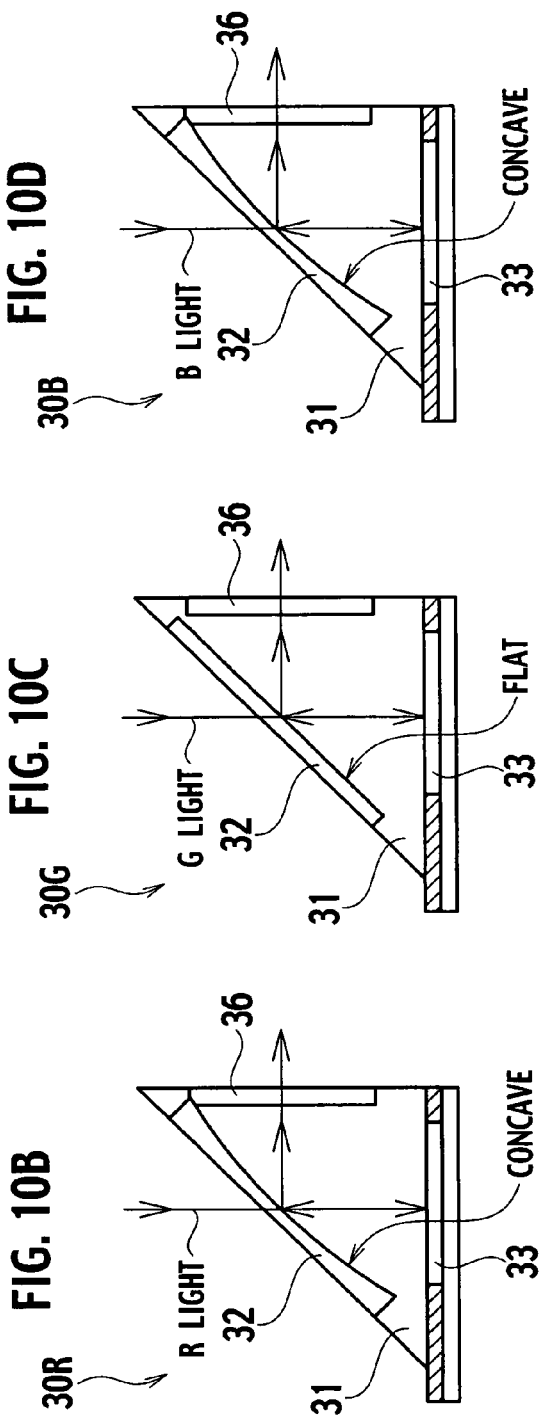

FIG. 11A
| CORRECTION CONFIGURATION 3 | | | |
|---|---|---|---|
| PRE-CORRECTION CHARACTERISTIC | | | FIG. 7A |
| LIGHT USED | | REFLECTION LIGHT | |
| WIRE GRID POLARIZER 32 | FOR R LIGHT | FLAT : r=∞ | |
| | FOR G LIGHT | CONCAVE : r=28740mm, f=+14370mm | |
| | FOR B LIGHT | FLAT : r=∞ | |
| POST-CORRECTION CHARACTERISTIC | | | FIG. 7B |
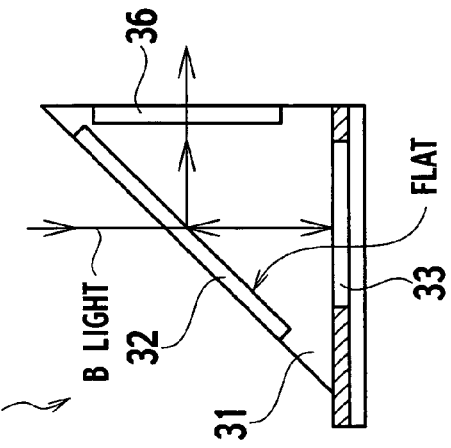
FIG. 11B
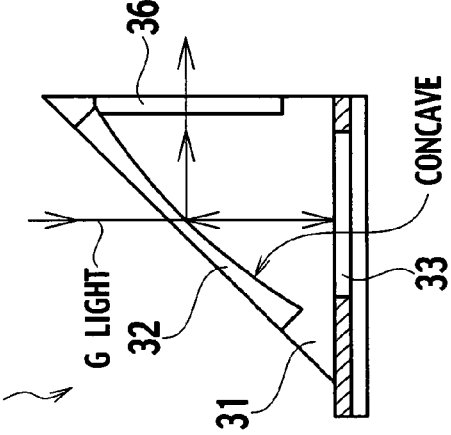
FIG. 11C
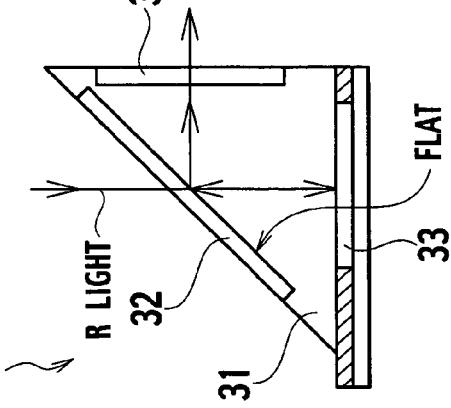
FIG. 11D

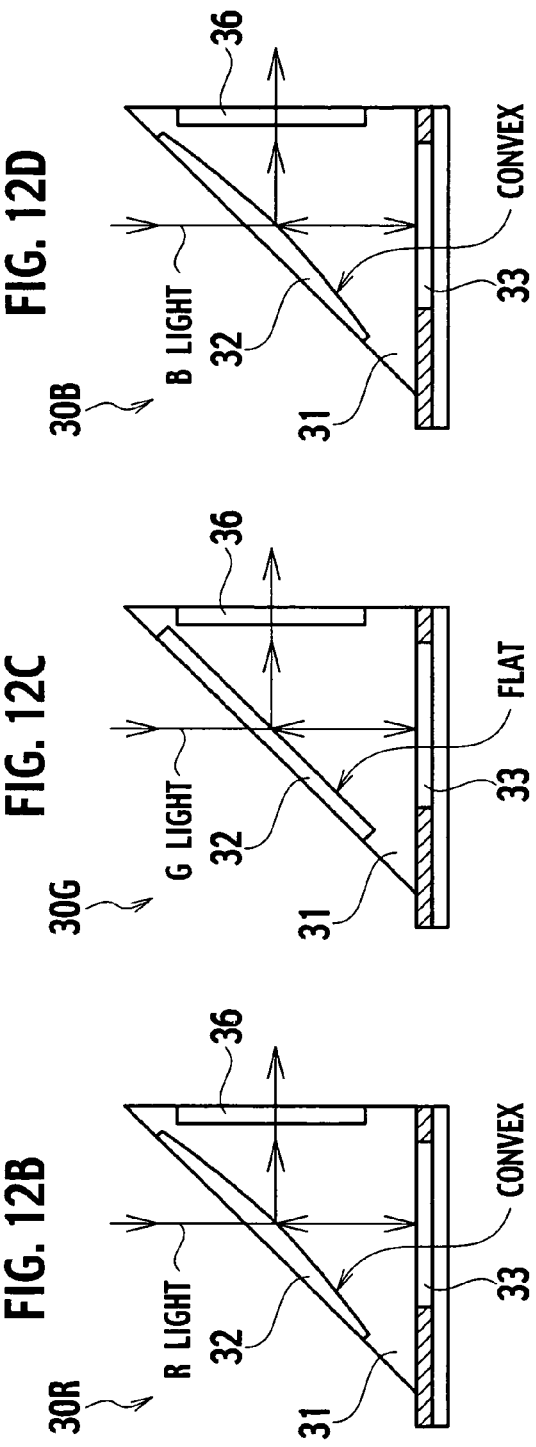

CONVEX SURFACE
(LIGHT TRANSMISSION SURFACE)

CONCAVE SURFACE
(LIGHT TRANSMISSION SURFACE)

FIG. 14A
CORRECTION CONFIGURATION 5
| PRE-CORRECTION CHARACTERISTIC | | FIG. 6A |
|---|---|---|
| LIGHT USED | | TRANSMISSION LIGHT |
| TRANSMISSION TYPE POLARIZING PLATE 36 | FOR R LIGHT | FLAT : r=∞ |
| | FOR G LIGHT | CONCAVE : r=8260mm, f=-15930mm |
| | FOR B LIGHT | FLAT : r=∞ |
| POST-CORRECTION CHARACTERISTIC | | FIG. 6B |
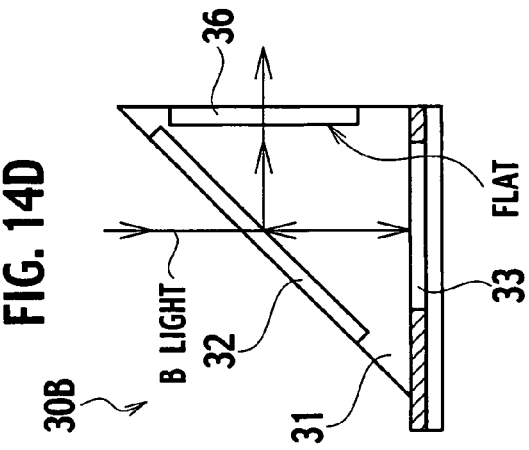
FIG. 14B
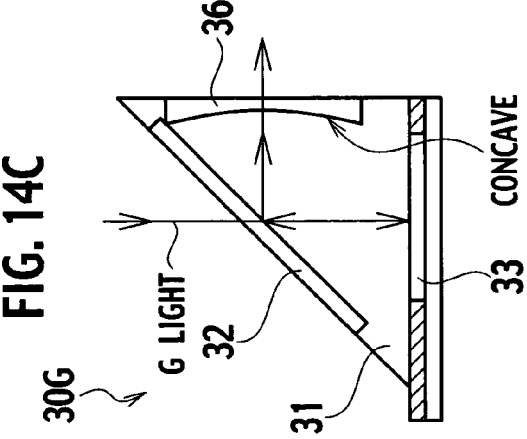
FIG. 14C
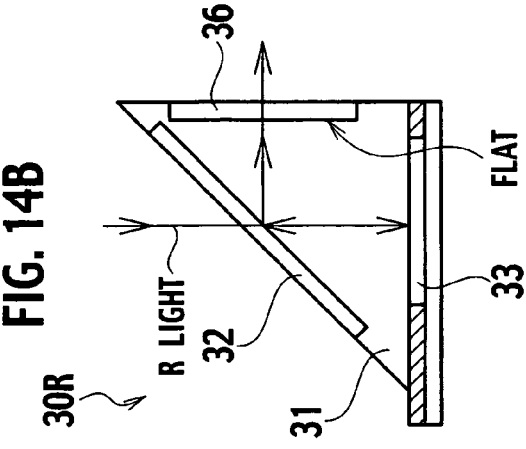
FIG. 14D

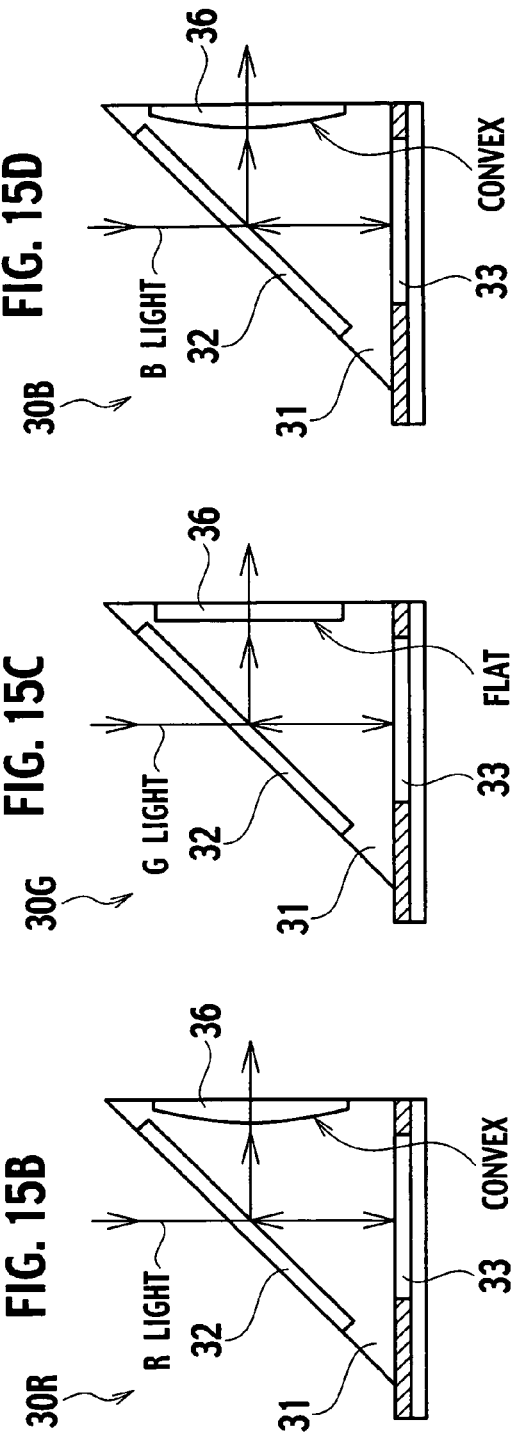

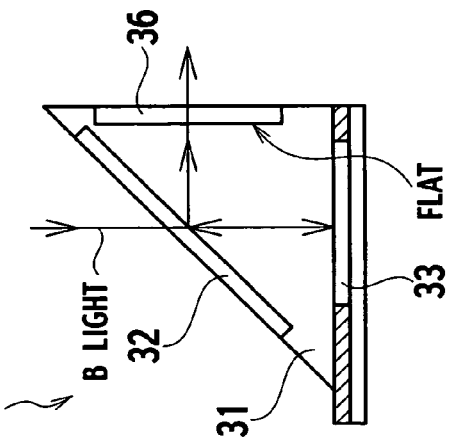
FIG. 16A
| CORRECTION CONFIGURATION 7 | | | |
|---|---|---|---|
| PRE-CORRECTION CHARACTERISTIC | | | FIG. 7A |
| LIGHT USED | | TRANSMISSION LIGHT | |
| TRANSMISSION TYPE POLARIZING PLATE 36 | FOR R LIGHT | FLAT : r=∞ | |
| | FOR G LIGHT | CONVEX : r=8260mm, f=+15930mm | |
| | FOR B LIGHT | FLAT : r=∞ | |
| POST-CORRECTION CHARACTERISTIC | | | FIG. 7B |
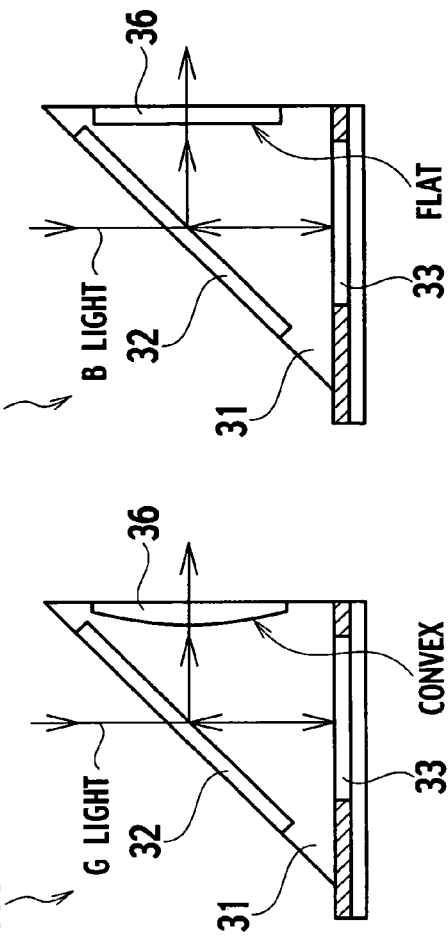
FIG. 16B
FIG. 16C
FIG. 16D

FIG. 17A
| CORRECTION CONFIGURATION 8 | | | |
|---|---|---|---|
| PRE-CORRECTION CHARACTERISTIC | | | FIG. 7A |
| LIGHT USED | | TRANSMISSION LIGHT | |
| TRANSMISSION TYPE POLARIZING PLATE 36 | FOR R LIGHT | CONCAVE : r=9799mm, f=-18898mm | |
| | FOR G LIGHT | FLAT : r=∞ | |
| | FOR B LIGHT | CONCAVE : r=6962mm, f=-13427mm | |
| POST-CORRECTION CHARACTERISTIC | | | FIG. 7B |
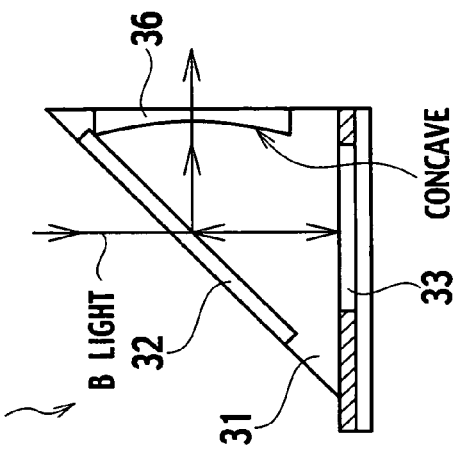
FIG. 17B
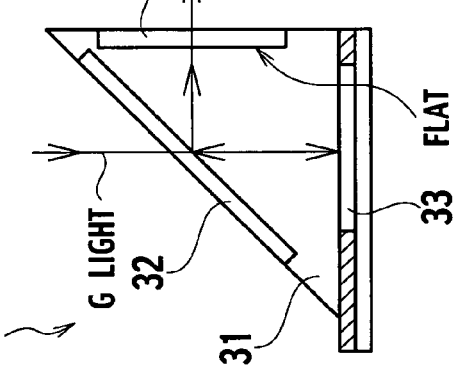
FIG. 17C
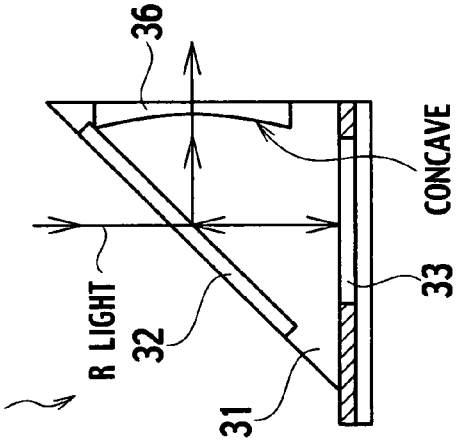
FIG. 17D

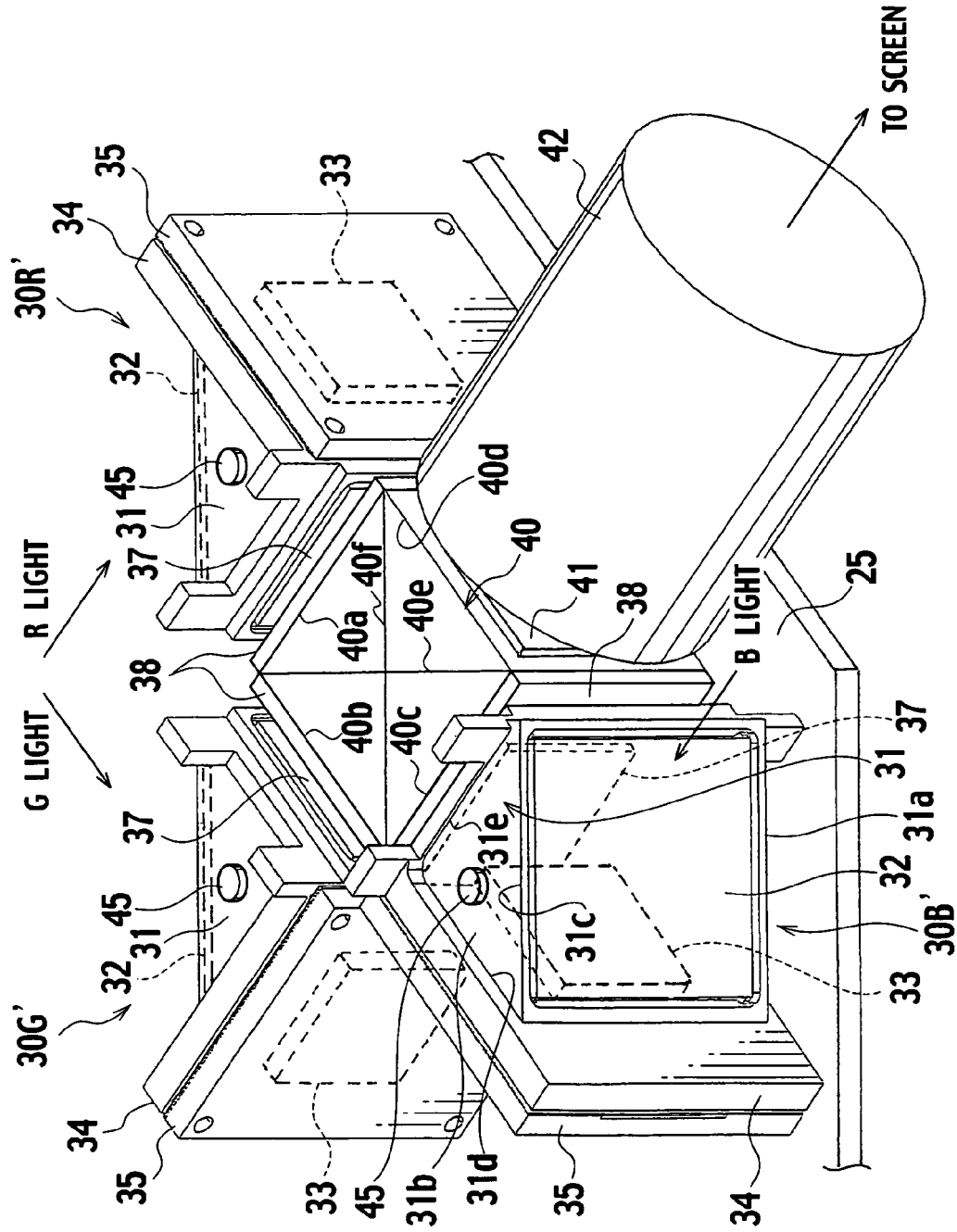

FIG. 20A
| CORRECTION CONFIGURATION 9 | | |
|---|---|---|
| PRE-CORRECTION CHARACTERISTIC | | FIG. 6A |
| LIGHT USED | TRANSMISSION LIGHT | |
| TRANSPARENT GLASS PLATE 37 | FOR R LIGHT | FLAT : r=∞ |
| | FOR G LIGHT | CONCAVE : r=8260mm, f=−15930mm |
| | FOR B LIGHT | FLAT : r=∞ |
| POST-CORRECTION CHARACTERISTIC | | FIG. 6B |
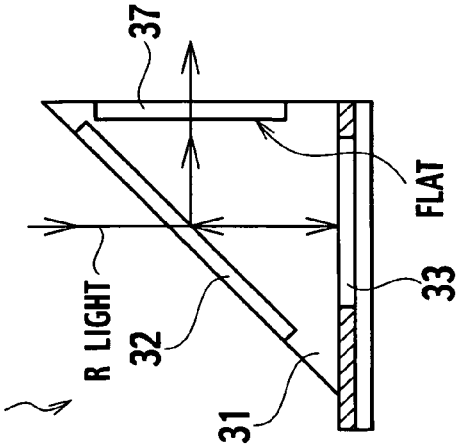
FIG. 20B
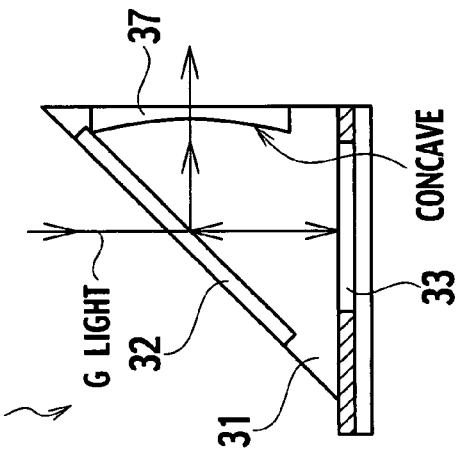
FIG. 20C
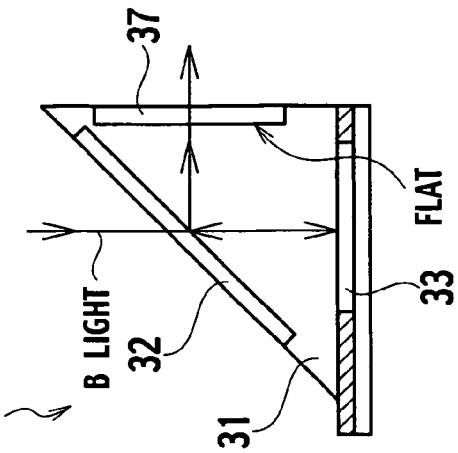
FIG. 20D FIG. 21A
| CORRECTION CONFIGURATION 10 | | |
|---|---|---|
| PRE-CORRECTION CHARACTERISTIC | | FIG. 6A |
| LIGHT USED | TRANSMISSION LIGHT | |
| TRANSPARENT GLASS PLATE 37 | FOR R LIGHT | CONVEX : r=9799mm, f=+18898mm |
| | FOR G LIGHT | FLAT : r=∞ |
| | FOR B LIGHT | CONVEX : r=6962mm, f=+13427mm |
| POST-CORRECTION CHARACTERISTIC | | FIG. 6B |
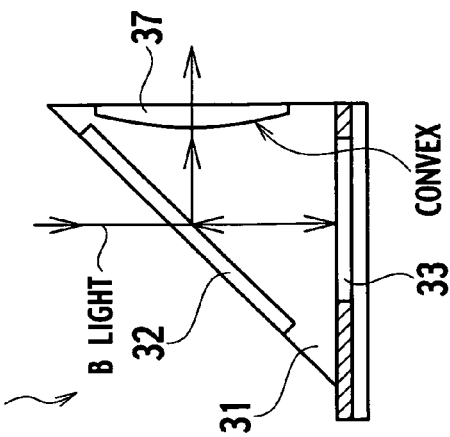
FIG. 21B
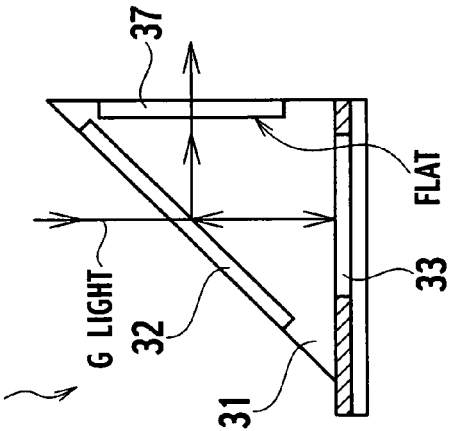
FIG. 21C
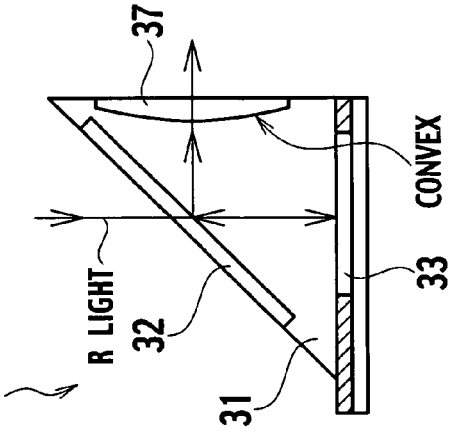
FIG. 21D

FIG. 22A
| CORRECTION CONFIGURATION 11 | | | | |
|---|---|---|---|---|
| PRE-CORRECTION CHARACTERISTIC | | | | FIG. 7A |
| LIGHT USED | | TRANSMISSION LIGHT | | |
| TRANSPARENT GLASS PLATE 37 | FOR R LIGHT | FLAT : r=∞ | | |
| | FOR G LIGHT | CONVEX : r=8260mm, f=+15930mm | | |
| | FOR B LIGHT | FLAT : r=∞ | | |
| POST-CORRECTION CHARACTERISTIC | | | | FIG. 7B |
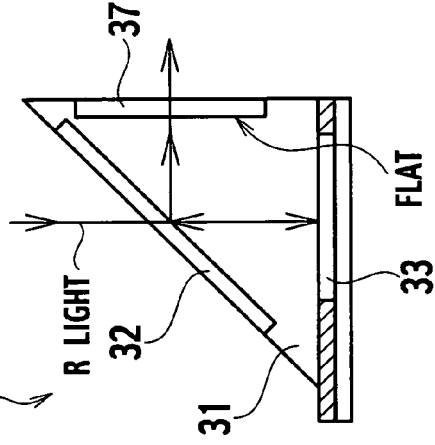
FIG. 22B
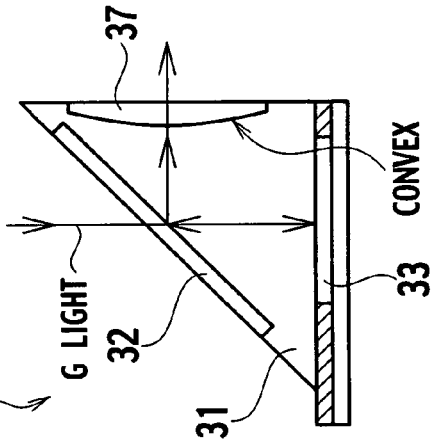
FIG. 22C
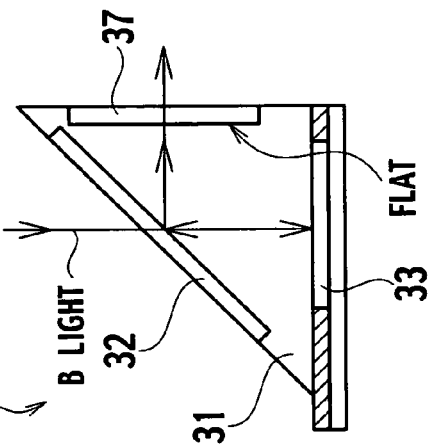
FIG. 22D

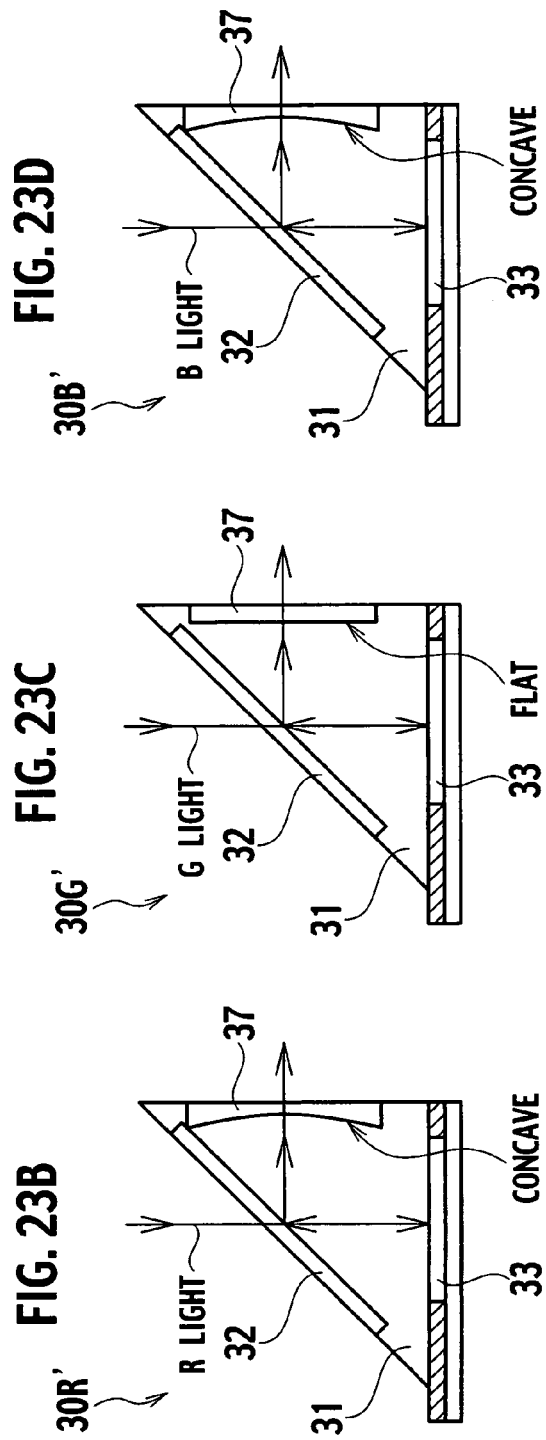

| CORRECTION CONFIGURATION 13 | | | | FIG. 6A |
|---|---|---|---|---|
| PRE-CORRECTION CHARACTERISTIC | | | | |
| | LIGHT USED | | TRANSMISSION LIGHT | |
| TRANSMISSION TYPE POLARIZING PLATE 38 | FOR R LIGHT | | FLAT : r=∞ | |
| | FOR G LIGHT | | CONCAVE : r=8260mm, f=−15930mm | |
| | FOR B LIGHT | | FLAT : r=∞ | |
| POST-CORRECTION CHARACTERISTIC | | | | FIG. 6B |

| CORRECTION CONFIGURATION 14 | | | FIG. 6A |
|---|---|---|---|
| PRE-CORRECTION CHARACTERISTIC | | | TRANSMISSION LIGHT |
| LIGHT USED | | FOR R LIGHT | CONVEX : r=9799mm, f=+18898mm |
| | | FOR G LIGHT | FLAT : r=∞ |
| TRANSMISSION TYPE POLARIZING PLATE 38 | | FOR B LIGHT | CONVEX : r=6962mm, f=+13427mm |
| POST-CORRECTION CHARACTERISTIC | | | FIG. 6B |

| CORRECTION CONFIGURATION 15 | | FIG. 7A |
|---|---|---|
| PRE-CORRECTION CHARACTERISTIC | | TRANSMISSION LIGHT |
| LIGHT USED | | |
| TRANSMISSION TYPE POLARIZING PLATE 38 | FOR R LIGHT | FLAT : r=∞ |
| | FOR G LIGHT | CONVEX : r=8260mm, f=+15930mm |
| | FOR B LIGHT | FLAT : r=∞ |
| POST-CORRECTION CHARACTERISTIC | | FIG. 7B |

| CORRECTION CONFIGURATION 17 | | FIG. 6A |
|---|---|---|
| PRE-CORRECTION CHARACTERISTIC | | |
| LIGHT USED | | TRANSMISSION LIGHT |
| TRANSPARENT GLASS PLATE 39 | FOR R LIGHT | FLAT : r=∞ |
| | FOR G LIGHT | CONCAVE : r=8260mm, f=-15930mm |
| | FOR B LIGHT | FLAT : r=∞ |
| POST-CORRECTION CHARACTERISTIC | | FIG. 6B |

| CORRECTION CONFIGURATION 18 | | | FIG. 6A |
|---|---|---|---|
| PRE-CORRECTION CHARACTERISTIC | | | TRANSMISSION LIGHT |
| LIGHT USED | | FOR R LIGHT | CONVEX : r=9799mm, f=+18898mm |
| | TRANSPARENT GLASS PLATE 39 | FOR G LIGHT | FLAT : r=∞ |
| | | FOR B LIGHT | CONVEX : r=6962mm, f=+13427mm |
| POST-CORRECTION CHARACTERISTIC | | | FIG. 6B |

| CORRECTION CONFIGURATION 19 | | FIG. 7A |
|---|---|---|
| PRE-CORRECTION CHARACTERISTIC | | TRANSMISSION LIGHT |
| LIGHT USED | FOR R LIGHT | FLAT : r=∞ |
| TRANSPARENT GLASS PLATE 39 | FOR G LIGHT | CONVEX : r=8260mm, f=+15930mm |
| | FOR B LIGHT | FLAT : r=∞ |
| POST-CORRECTION CHARACTERISTIC | | FIG. 7B |

| CORRECTION CONFIGURATION 20 | | FIG. 7A |
|---|---|---|
| PRE-CORRECTION CHARACTERISTIC | | TRANSMISSION LIGHT |
| LIGHT USED | FOR R LIGHT | CONCAVE : r=9799mm, f=-18898mm |
| TRANSPARENT GLASS PLATE 39 | FOR G LIGHT | FLAT : r=∞ |
| | FOR B LIGHT | CONCAVE : r=6962mm, f=-13427mm |
| POST-CORRECTION CHARACTERISTIC | | FIG. 7B |

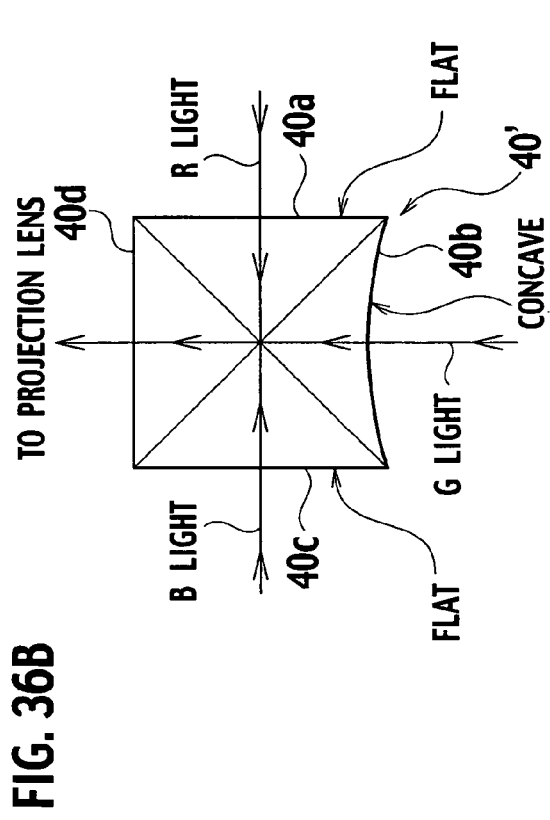

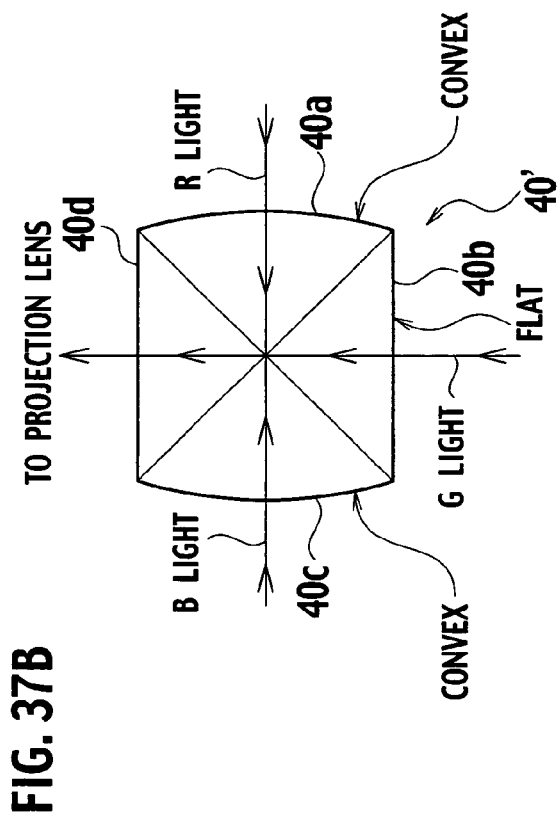

| CORRECTION CONFIGURATION 23 | | | FIG. 7A |
|---|---|---|---|
| PRE-CORRECTION CHARACTERISTIC | | | |
| | LIGHT USED | | TRANSMISSION LIGHT |
| THREE-COLOR COMBINATION CROSS DICHROIC PRISM 40' | FOR R LIGHT | | FLAT : r=∞ |
| | FOR G LIGHT | | CONVEX : r=8260mm, f=+15930mm |
| | FOR B LIGHT | | FLAT : r=∞ |
| POST-CORRECTION CHARACTERISTIC | | | FIG. 7B |

| CORRECTION CONFIGURATION 24 | | FIG. 7A |
|---|---|---|
| PRE-CORRECTION CHARACTERISTIC | | |
| LIGHT USED | | TRANSMISSION LIGHT |
| THREE-COLOR COMBINATION CROSS DICHROIC PRISM 40' | FOR R LIGHT | CONCAVE : r=9799mm, f=-18898mm |
| | FOR G LIGHT | FLAT : r=∞ |
| | FOR B LIGHT | CONCAVE : r=6962mm, f=-13427mm |
| POST-CORRECTION CHARACTERISTIC | | FIG. 7B |

REFLECTION TYPE PROJECTION DISPLAY APPARATUS

BACKGROUND OF THE INVENTION

1. Field of the Invention

The present invention relates to a reflection type projection display apparatus in which red, green, and blue image lights respectively coming from reflection type spatial light modulation elements (reflection type liquid crystal panels) respectively for red, green, and blue light are reflected by wire grid polarizers respectively for red, green, and blue light; unwanted polarization component is excluded therefrom; and then the image lights are color-combined by a color combination optical system to be projected on a projection plane (for example, a screen) by a projection lens. Specifically, the present invention relates to such a reflection type projection display that is capable of correcting lateral chromatic aberration on the projection plane.

2. Description of the Related Art

A projection display apparatus for projecting color image in magnification can be categorized into various types depending on its configuration, specifically, an arrangement of constituting optical components. Typically, there are two types—one is a transmission type projection display apparatus and the other is a reflection type projection display apparatus. In the former, light to be projected passes through a spatial light modulation element using a liquid crystal panel, whereas in the latter the light is reflected by the spatial light modulation element. In both types of apparatus, white light emitted from a light source is color-separated into red (R) light, green (G) light, and blue (B) light by a color separation optical system; the lights of the three primary colors are guided to liquid crystal panels respectively for R, G, and B light to be optically modulated into image lights of R, G, and B color; the image lights are color-combined into a color-combined image light by a color-combination optical system; and the color-combined image light is projected in magnification on a screen by a projection lens.

When the color-combined image light produced by color-combining image lights of R, G, and B colors using the color-combination optical system is projected by the projection lens, since the wavelengths of the color-combined image light are in a range from blue to red color region, namely, cover from 400 nm to 700 nm, and a magnifying power of the projection lens is different depending on the wavelength, a lateral chromatic aberration takes place on the screen.

Lateral chromatic aberration can be corrected by designing the projection lens. However, such designing is rather expensive and, besides, the lens has to be fabricated with an expensive glass material, thereby leading to an increased production cost. In order to solve such a problem inexpensively, there has been proposed a projection display apparatus which is provided with a plus or minus correction lens means above part or all of image forming surface of a plurality of liquid crystal devices (light valve) so as to reduce the lateral chromatic aberration on the screen (See, Japanese Patent No. 2867529).

FIG. 1 is a schematic view of a related art projection display apparatus. FIGS. 2A and 2B are an explanatory view for explaining the reason how a lateral chromatic aberration takes place on a screen when R, G, and B lights are projected by a projection lens in the related art projection display apparatus.

The related art projection display apparatus 100 illustrated in FIG. 1 has been disclosed in the above publication and will be described briefly here referring to the publication.

As illustrated in FIG. 1, white light emitted by a white light source 101 is incident upon a dichroic mirror 102 that reflects R (red) light and allows G (green) light and B (blue) light to pass therethrough.

The R light is reflected by the dichroic mirror 102 to change its proceeding direction by 90 degrees and thus to reach a reflection mirror 103. Next, the R light is reflected by the reflection mirror 103 to change its proceeding direction again by 90 degrees. Then, the R light reaches to a liquid crystal light bulb 105R for R light after passing through a condenser lens 104R for R light, and is optically modulated by the liquid crystal light bulb 105R in accordance with an image signal to become R image light. Furthermore, the R image light passes through a plus correction lens 106 and then a dichroic mirror 107.

On the other hand, the G light and the B light that have passed through the dichroic mirror 102 are incident upon a dichroic mirror 108 that reflects the B light and allows the G light to pass therethrough. The B light that is reflected by the dichroic mirror 108 to change its proceeding direction by 90 degrees reaches a liquid crystal light bulb 105B after passing through a condenser lens 104B for B light. The B light is optically modulated by the liquid crystal light bulb 105B in accordance with an image signal to be B image light. Then the B image light passes through a minus correction lens 109 and is reflected by a dichroic mirror 107. Here, the aforementioned R image light and the B image light are combined by the dichroic mirror 107 and the combined light passes through a dichroic mirror 111.

On the other hand, the G light that has passed through the dichroic mirror 108 proceeds through a condenser lens 104G for G light and a liquid crystal light bulb 105G in this order. The G light is optically modulated to become G image light by the liquid crystal light bulb 105G and then reflected to change its proceeding direction by 90 degrees by a reflection mirror 110 to be incident upon the dichroic mirror 111. Then, the G image light is reflected and color-combined with the aforementioned R and G image light by the dichroic mirror 111. Finally, the color-combined light produced by color-combining the three image lights is projected on a screen 113 in magnification by a projection lens 112.

As illustrated in FIG. 2A, when the color-combined image light produced by color-combining the R, G, and B image lights is projected on the screen 112 in magnification by the projection lens 112 that is composed of a plus correction lens 112a, an aperture 112b, and a minus correction lens 112c, all of which are arranged in this order from the light incident surface to the light exit surface, a refractive index of the projection lens 112 is varied depending on the wavelength of the R, G, and B light component. Namely, the B light component is refracted to a greatest extent and the R light component is refracted to a least extent. Therefore, an image forming magnification becomes lower in the order of the B, G, and R light component.

As illustrated in FIG. 2B, due to such a difference, the B light component is focused at a position furthest away from the screen center and the B light component is focused at a position nearest to the screen center compared with the focused G light on the screen 113. This is how lateral chromatic aberration takes place on the screen 113.

Therefore, in the above projection display apparatus 100 of the related art, while the G light component among the R, G, and B components is set as reference, the plus correction lens 106 is provided adjacent to the exit surface of the liquid crystal light bulb 105R for R and the minus correction lens 109 is provided adjacent to the exit surface of the liquid crystal light bulb 105B. With this configuration, the R, G, and B light components of the color-combined image light are all focused on one point on the screen 113 as white light. This is how the lateral chromatic aberration is corrected on the screen 113.

By the way, although a drawing is omitted, here the publication also discloses that when the projection lens is composed of a minus lens, an aperture, and a plus lens in this order from the incident surface to the exit surface thereof, the image forming magnification becomes lower in the order of the R, G, and B light component, which is an opposite order in the above.

In the above projection display apparatus 100, it is since a correction lens means such as the plus correction lens 106 or the minus correction lens 109 is provided so as to be positioned between all or part of the image forming surface of the liquid crystal devices (the light bulbs) 105R, 105G, 105B and the projection lens 112 along the light path that the lateral chromatic aberration can be corrected. Although this configuration is well suited to correct the lateral chromatic aberration on the screen for a projection display apparatus that employs the transmission type liquid crystal devices (the light bulbs) 105R, 105G, 105B, it is somewhat disadvantageous in terms of resolution of the image projected on the screen.

Therefore, there has been desired a reflection type projection display apparatus that is able to efficiently correct the lateral chromatic aberration on an projection plane (for example, a screen) when a wire grid polarizer having an excellent polarizing properties respectively for R, G, and B lights emitted from a reflection type spatial light modulation element (a reflection type liquid crystal panel) that is capable of improving resolution in a reflection type projection display apparatus employing a reflection type spatial light modulation element.

SUMMARY OF THE INVENTION

The present invention has been made in view of above. A first aspect of the present invention provides a reflection type projection display apparatus comprising reflection type spatial light modulation elements provided respectively for R, G and B light; illumination units for radiating R, G and B light respectively on the reflection type spatial light modulation elements; wire grid polarizers provided respectively for R, G and B light, and arranged inclined at an angle of 45 degrees in relation to a respective optical axis of R, G and B light from the illumination units, the wire grid polarizers each allowing a first polarization component included in the R, G, or B light from the illumination units to pass therethrough and reflecting second polarization components of R, G and B colors that have been produced when the reflection type spatial light modulation elements respectively for R, G and B light light-modulate and reflect the first polarization component having once passed through the wire grid polarizers respectively for R, G and B light; transmission type polarizing plates provided respectively for R, G and B light, and arranged to intersect a respective optical axis of the second polarization components of R, G and B colors that have been reflected by the wire grid polarizers respectively for R, G and B light, the transmission type polarizing plates excluding unwanted polarization component that has been reflected by the wire grid polarizer along with the second polarization components, thereby allowing the second polarization components of R, G and B colors to pass therethrough; a color combination optical system that has light incident surfaces for allowing to enter therein the respective second polarization component of R, G or B color that has passed through respective the transmission type polarizing plates and color-combines to produce color-combined light to be projected; and a projection lens for projecting the color-combined light. In this reflection type projection display apparatus, any one of the light reflection surface of at least one of the wire grid polarizers respectively for R, G and B light, the light transmission surface of at least one of the transmission type polarizing plates for R, G and B light, and at least one of the light incident surfaces of the color combination optical system is convexly or concavely shaped in accordance with lateral chromatic aberration of the projection lens, thereby correcting for the Ruction of the lateral chromatic aberration of the image projected on a projection plane by the projection lens.

A second aspect of the present invention provides a reflection type projection display apparatus according to the first aspect, wherein reflection type projection display apparatus as recited in claim 1, wherein the color combination optical system is made of a transparent resin material when at least one of the light incident surfaces respectively for R, G and B light thereof is convexly or concavely shaped in accordance with the lateral chromatic aberration of the projection lens.

A third aspect of the present invention provides a reflection type projection display apparatus comprising reflection type spatial light modulation elements provided respectively for R, G and B light; illumination units for radiating R, G and B light respectively on the reflection type spatial light modulation elements; wire grid polarizers provided respectively for R, G and B light, and arranged inclined at an angle of 45 degrees in relation to a respective optical axis of R, G and B light from the illumination units, the wire grid polarizers each allowing a first polarization component included in the R, G, or B light from the illumination units to pass therethrough and reflecting second polarization components of R, G and B colors that have been produced when the reflection type spatial light modulation elements respectively for R, G and B light light-modulate and reflect the first polarization component having once passed through the wire grid polarizers respectively for R, G and B light; transparent glass plates provided respectively for R, G and B light, and arranged to intersect a respective optical axis of the second polarization components of R, G and B colors that have been reflected by the wire grid polarizers respectively for R, G and B light, the transparent glass plates allowing to pass therethrough the second polarization components of R, G and B colors that have been reflected by the wire grid polarizers respectively for R, G and B light; a color combination optical system that has light incident surfaces for allowing to enter therein the respective second polarization component of R, G, or B color having passed through respective the transparent glass plate, the light incident surfaces each being provided thereon with a transmission type polarizing plate that excludes unwanted polarization component included in the light having passed through the transparent glass plate along with the second polarization components, thereby allowing the second polarization components to exit therethrough, and color-combines the second polarization components of R, G and B colors having passed through respective the transparent glass plates to produce color-combined light to be projected; and a projection lens for projecting the color-combined light. In this reflection type projection display apparatus, any one of the light reflection surface of at least one of the wire grid polarizers respectively for R, G and B light, the light transmission surface of at least one of the transparent glass plates respectively for R, G and B light, and the light transmission surface of at least one of the transmission type polarizing plates respectively for R, G and B light is convexly or concavely shaped in accordance with lateral chromatic aberration of the projection lens, thereby correcting for the Ruction of the lateral chromatic aberration of the image projected on a projection plane by the projection lens.

A fourth aspect of the present invention provides a reflection type projection display apparatus comprising reflection type spatial light modulation elements provided respectively for R, G and B light; illumination units for radiating R, G and B light respectively on the reflection type spatial light modulation elements; wire grid polarizers provided respectively for R, G and B light, and arranged inclined at an angle of 45 degrees in relation to a respective optical axis of R, G and B light from the illumination units, the wire grid polarizers each allowing a first polarization component included in the R, G, or B light from the illumination units to pass therethrough and reflecting second polarization components of R, G and B colors that have been produced when the reflection type spatial light modulation elements respectively for R, G and B light light-modulate and reflect the first polarization component having once passed through the wire grid polarizers respectively for R, G and B light; transmission type polarizing plates provided respectively for R, G and B light, and arranged to intersect a respective optical axis of the second polarization components of R, G and B colors that have been reflected by the wire grid polarizers respectively for R, G and B light, the transmission type polarizing plates excluding unwanted polarization component that has been reflected by the wire grid polarizer along with the second polarization components, thereby allowing the second polarization components of R, G and B colors to pass therethrough; a color combination optical system that has light incident surfaces for allowing to enter therein the respective second polarization component of R, G, or B color having passed through respective the transmission type polarizing plates, the light incident surfaces each being provided thereon with a transparent glass plate for allowing the second polarization components to pass therethrough, and color-combines the second polarization components of the R, G and B colors having passed through respective the transparent glass plates to produce color-combined light to be projected; and a projection lens for projecting the color-combined light. In this reflection type projection display apparatus, the light transmission plate of at least one of the transparent glass plates respectively for R, G and B light is convexly or concavely shaped in accordance with the lateral chromatic aberration of the projection lens, thereby correcting for the Ruction of the lateral chromatic aberration of the image projected on a projection plane by the projection lens.

According to the first aspect of the present invention, dimensions of an image created by at least one of R, G, and B lights on a projection plane can be adjusted to be the same as those of images created by other lights, thereby correcting for the reduction of lateral chromatic aberration of the image projected on a projection plane. This is because any one of the light reflection surface of at least one of the wire grid polarizers respectively for R, G and B light, the light transmission surface of at least one of the transmission type polarizing plates for R, G and B light, and at least one of the light incident surfaces of the color combination optical system is convexly or concavely shaped in accordance with lateral chromatic aberration of the projection lens, for the purpose of correcting for the reduction of lateral chromatic aberration of the image projected on a projection plane. The reflection type projection apparatus according to the first aspect includes the wire grid polarizers provided respectively for R, G and B light that allow a first polarization component included in the R, G, or B light from the illumination units to pass therethrough and reflect second polarization components of R, G and B colors that have been produced when the reflection type spatial light modulation elements respectively for R, G and B light light-modulate and reflect the first polarization component having once passed through the wire grid polarizers respectively for R, G and B light, the transmission type polarizing plates provided respectively for R, G and B light, and the color combination optical system in this order along a light path.

According to the second aspect of the present invention, the light incident surfaces of the color combination optical system can be easily convexly or concavely shaped since the color combination optical system is made of a transparent resin material when the light incident surfaces are utilized to correct for the reduction of lateral chromatic aberration.

According to the third aspect of the present invention, dimensions of an image created by at least one of R, G, and B lights on a projection plane can be adjusted to be the same as those of images created by other lights, thereby correcting for the reduction of lateral chromatic aberration of the image projected on a projection plane. This is because any one of the light reflection surface of at least one of the wire grid polarizers respectively for R, G and B light, the light transmission surface of at least one of the transparent glass plates respectively for R, G and B light, and the light transmission surface of at least one of the transmission type polarizing plates respectively for R, G and B light is convexly or concavely shaped in accordance with lateral chromatic aberration of the projection lens, for the purpose of correcting for the reduction of lateral chromatic aberration of the image projected on a projection plane. The reflection type projection display apparatus according to the third aspect includes the wire grid polarizers provided respectively for R, G and B light that allow a first polarization component included in the R, G, or B light from the illumination units to pass therethrough and reflect second polarization components of R, G and B colors that have been produced when the reflection type spatial light modulation elements respectively for R, G and B light light-modulate and reflect the first polarization component having once passed through the wire grid polarizers respectively for R, G and B light, the transparent glass plates provided respectively for R, G and B light, and the color combination optical system of which light incident surfaces are provided with the transmission type polarizing plates respectively for R, G and B light in this order along a light path.

According to the fourth aspect of the present invention, dimensions of an image created by at least one of R, G, and B lights on a projection plane can be adjusted to be the same as those of images created by other lights, thereby correcting for the reduction of lateral chromatic aberration of the image projected on a projection plane. This is because the light transmission plate of at least one of the transparent glass plates respectively for R, G and B light is convexly or concavely shaped in accordance with the lateral chromatic aberration of the projection lens, for the purpose of correcting for the reduction of lateral chromatic aberration of the image projected on a projection plane. The reflection type projection display apparatus according to the fourth aspect includes the wire grid polarizers provided respectively for R, G and B light that allow a first polarization component included in the R, G, or B light from the illumination units to pass therethrough and reflect second polarization components of R, G and B colors that have been produced when the reflection type spatial light modulation elements respectively for R, G and B light light-modulate and reflect the first polarization component having once passed through the wire grid polarizers respectively for R, G and B light, the transmission type polarizing plates provided respectively for R, G and B light, and the color combination optical system of which light incident surfaces are provided with the transparent glass plates respectively for R, G and B light in this order along a light path.

BRIEF DESCRIPTION OF THE DRAWINGS

In the accompanying drawings:

FIGS. 9A to 9D are an explanatory view of a correction configuration 1 that corrects the lateral chromatic aberration on a projection plane using a wire grid polarizer 32 in the first embodiment;

FIGS. 10A to 10D are an explanatory view of a correction configuration 2 that corrects the lateral chromatic aberration on the projection plane using a wire grid polarizer 32 in the first embodiment;

FIGS. 11A to 11D are an explanatory view of a correction configuration 3 that corrects the lateral chromatic aberration of the image on the projection plane using a wire grid polarizer 32 in the first embodiment;

FIGS. 12A to 12D are an explanatory view of a correction configuration 4 that corrects the lateral chromatic aberration of the image on the projection plane using a wire grid polarizer 32 in the first embodiment;

FIGS. 14A to 14D are an explanatory view of a correction configuration 5 that corrects the lateral chromatic aberration of the image on the projection plane using a transmission type polarizing plate 36 in the first embodiment;

FIGS. 15A to 15D are an explanatory view of a correction configuration 6 that corrects the lateral chromatic aberration of the image on the projection plane using a transmission type polarizing plate 36 in the first embodiment;

FIGS. 16A to 16D are an explanatory view of a correction configuration 7 that corrects the lateral chromatic aberration of the image on the projection plane using a transmission type polarizing plate 36 in the first embodiment;

FIGS. 17A to 17D are an explanatory view of a correction configuration 8 that corrects the lateral chromatic aberration of the image on the projection plane using a transmission type polarizing plate 36 in the first embodiment;

FIG. 19 is a perspective view of reflection type liquid crystal panel assemblies respectively for R, G, and B lights, a three-color combination cross dichroic prism, and a projection lens of the reflection type projection display apparatus in FIG. 18, seen slantly upward from the reverse side of these components;

FIGS. 20A to 20D are an explanatory view of a correction configuration 9 that corrects the lateral chromatic aberration on the projection plane using a transparent glass plate 37 in the second embodiment;

FIGS. 21A to 21D are an explanatory view of a correction configuration 10 that corrects the lateral chromatic aberration on the projection plane using a transparent glass plate 37 in the second embodiment;

FIGS. 22A to 22D are an explanatory view of a correction configuration 11 that corrects the lateral chromatic aberration on the projection plane using a transparent glass plate 37 in the second embodiment;

FIGS. 23A to 23D are an explanatory view of a correction configuration 12 that corrects the lateral chromatic aberration on the projection plane using a transparent glass plate 37 in the second embodiment;

FIGS. 36A and 36B are an explanatory view of a correction configuration 21 that corrects the lateral chromatic aberration of the image on the projection plane using a three-color combination cross dichroic prism 40' made of a resin in the fourth embodiment;

FIGS. 37A and 37B are an explanatory view of a correction configuration 22 that corrects the lateral chromatic aberration of the image on the projection plane using a three-color combination cross dichroic prism 40' made of a resin in the fourth embodiment;

DESCRIPTION OF THE PREFERRED EMBODIMENTS

A First Embodiment

Figure 3:
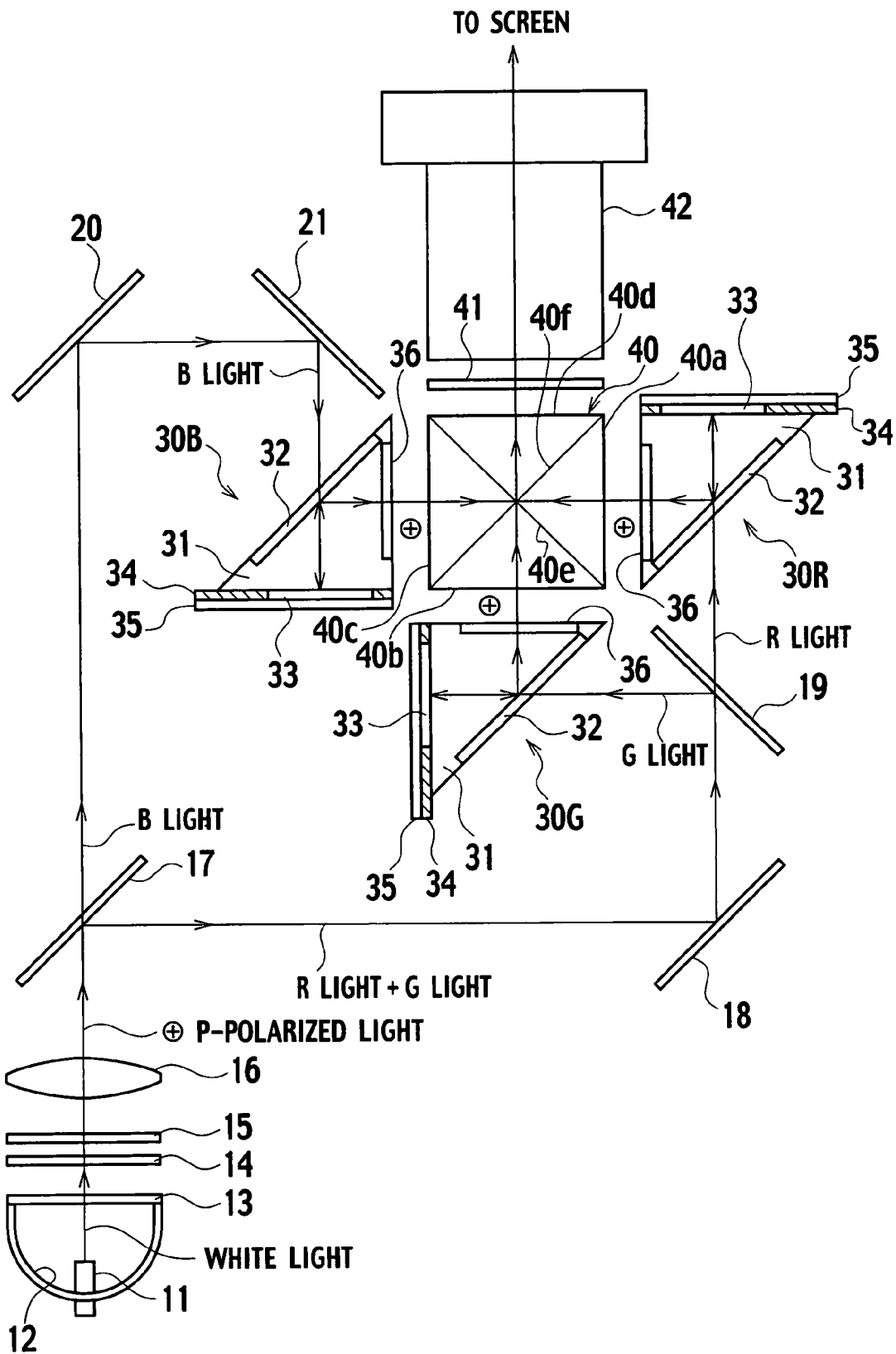
FIG. 3 is a plain view for explaining a reflection type projection display apparatus according to a first embodiment of the present invention.
Figure 4:
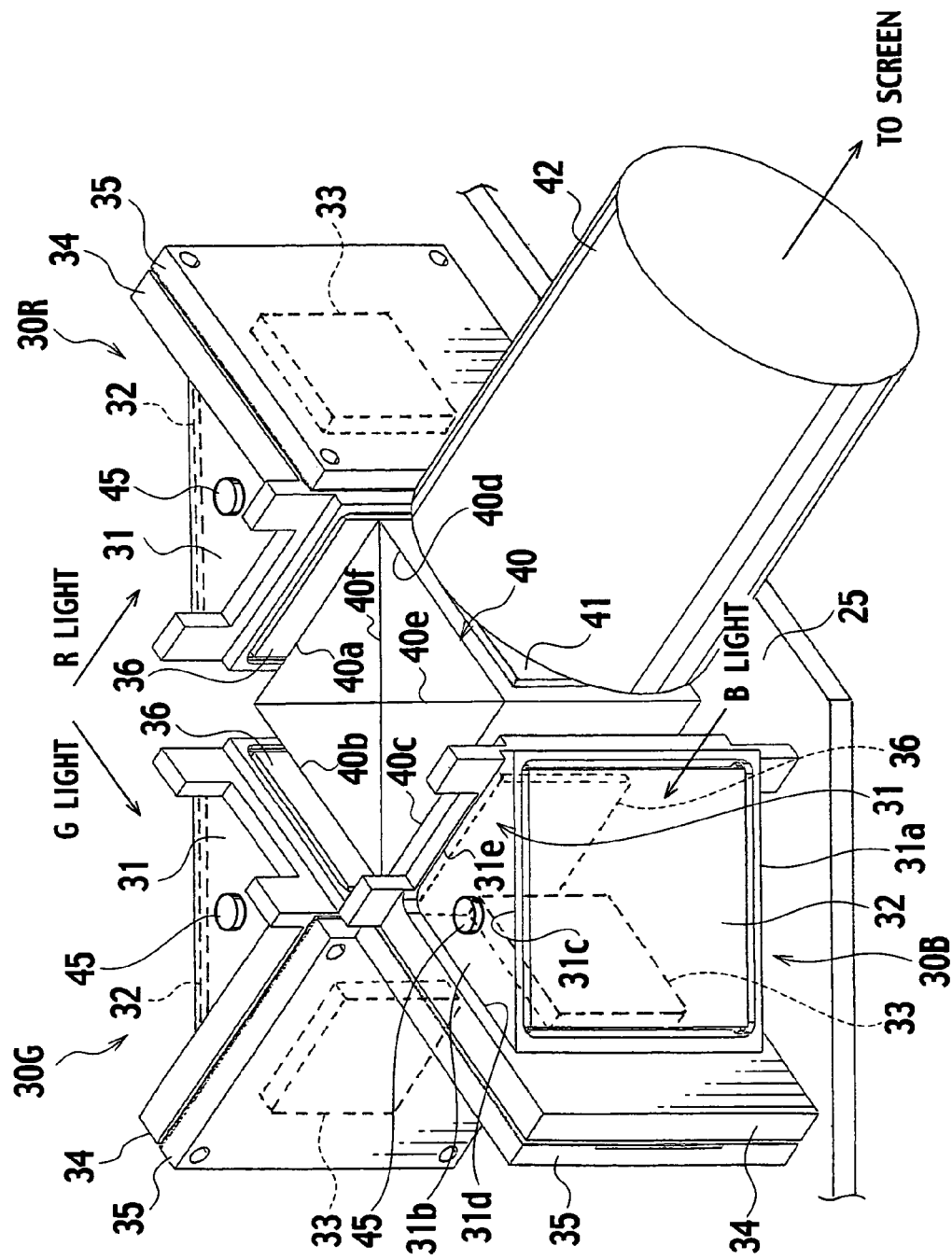
FIG. 4 is a perspective view of reflection type liquid crystal panel assemblies respectively for R, G, and B lights, a three-color combination cross dichroic prism, and a projection lens of the reflection type projection display apparatus according to the first embodiment, seen slantly upward from the reverse side of these components.
Figure 5A:
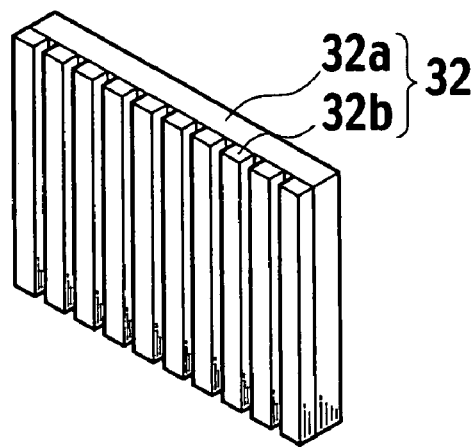
FIGS. 5A to 5C are an explanatory view of a wire grid polarizer included in each reflection type liquid crystal panel assembly of the reflection type projection display apparatus according to the first embodiment of the present invention.
Figure 5B:
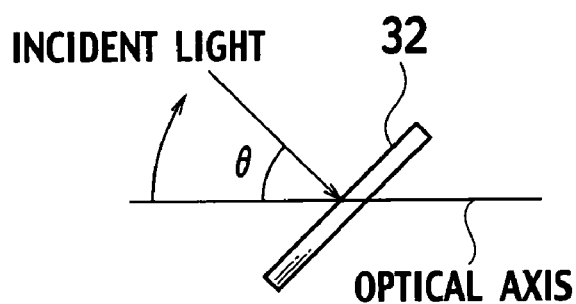
Figure 5C:
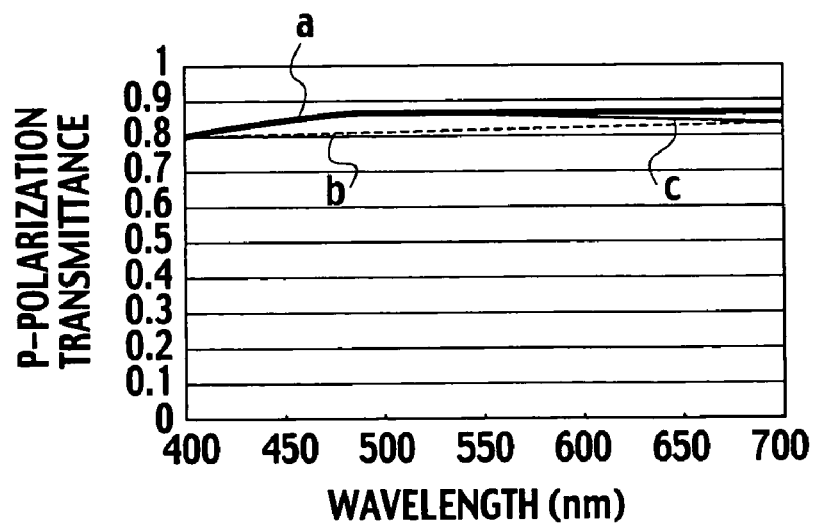

FIG. 3 is a plain view for explaining a reflection type projection display apparatus according to a first embodiment of the present invention. FIG. 4 is a perspective view of reflection type liquid crystal panel assemblies respectively for R, G, and B lights, a three-color combination cross dichroic prism, and a projection lens of the reflection type projection display apparatus according to the first embodiment, seen slantly upward from the reverse side of these components. FIGS. 5A to 5C are an explanatory view of a wire grid polarizer included in each reflection type liquid crystal panel assembly of the reflection type projection display apparatus according to the first embodiment of the present invention.

As illustrated in FIG. 3, a projection display apparatus 10A according to the first embodiment of the present invention is so configured as to include reflection type spatial light modulation elements respectively for R, G, and B light.

In the projection display apparatus 10A, a light source 11 that emits non-polarization white light, a color separation optical system 17, 19 that color-separates the white light emitted from the light source 11 into red (R) light, green (G) light, and blue (B) light, reflection type spatial light modulation elements (reflection type liquid crystal panels) 33 respectively for R, G, and B lights that light-modulate and reflect respectively the R, G and B lights produced by the color separation optical system 17, 19, wire grid polarizers 32 respectively for R, G, and B lights that reflect the light-modulated lights of R, G, and B color, a three-color combination cross dichroic prism 40 that color-combines the light-modulated lights of R, G, and B colors, and a projection lens 41 that projects the color-combined light produced by the three-color combination cross dichroic prism 40 on the screen (not shown) are arranged on the same plane.

The light source 11 emits non-polarization white light including R, G, and B light components by using such as but not limited to a metal halide lamp, a xenon lamp, a halogen lamp or the like. The white light emitted from the light source 11 is reflected by a paraboloid reflection mirror 12 to become collimated light and proceeds through a first fly-eye lens array 13 provided on the front of the mirror 12 and a second fly-eye lens array 14 provided in front of the first fly-eye lens 13 in this order. The fly-eye lens arrays 13, 14 mate with each other to constitute an integrator for making the light intensity of the white light two-dimensionally uniform. By the way, in front of the light source 11 may be disposed a non-visible light elimination filter for excluding ultraviolet light and infrared light (not shown).

The non-polarization white light whose intensity is made uniform by the first and the second fly-eye lens arrays 13, 14 is incident upon a polarization conversion prism array 15 as a polarization conversion optical device. The polarization conversion prism array 15 is composed of a polarization separation prism array and a λ/2 phase differential plate, taking a shape of plate as a whole. The light incident upon the polarization conversion prism array 15 is firstly separated, by a polarization beam splitter film surface that is included in the polarization separation prism array 15, into P-polarization component and S-polarization component with respect to the surface.

By the way, the polarization conversion prism array 15 has a plurality of polarization beam splitter film surfaces that are arranged parallel with one another and inclined at an angle of 45 degrees with respect to the main surface of the polarization conversion prism array 15. With this configuration, the P-polarization component passes therethrough and exit from the front surface of the polarization conversion prism array 15, whereas the S-polarization component is reflected by one polarization beam splitter film surface so as to be deflected by an angle of 90 degrees and then reflected by the adjacent polarization beam splitter film surface by the same angle again to finally exit from the front surface.

In an area to which such an S-polarization component (that is, the S-polarization component reflected twice by the polarization beam splitter film surface) proceeds, the ½ phase plate is provided. The S-polarization component that passes through the ½ phase plate undergoes a 90 degree rotation to have the same polarization direction as that of the P polarization component that has passed through the polarization beam splitter film surface. In this manner, after passing through the polarization conversion prism array 15, the non-polarized white light from the light source 11 turns into polarization light having one polarization direction.

In the first embodiment, the light that has passed through the polarization conversion prism array 15 is converted into polarized light for example having P-polarization, as illustrated by a "circled plus" sign in FIG. 3. However, since a polarization conversion is not 100% efficient, the exiting light from the polarization conversion prism array 15 includes several to several tens percent of S polarization component.

By the way, the polarization direction of the light that exits from the polarization conversion prism array 15 is assumed to be P (a first polarization light) in the following description. However, the direction is not really limited to P. It is readily apparent to one of ordinary skill in the art that the non-polarized white light can be polarized into S-polarization component by the polarization conversion prism array 15.

The P-polarized white light that has come out from the polarization conversion prism array 15 passes though a field lens 16 and then enters a first dichroic mirror (color separation optical system) 17. The first dichroic mirror 17 reflects the R light component and the G light component from the white light including R, G, and B light component, to change the proceeding direction thereof by 90 degrees and allows the remaining B light to proceed forward.

The R and G lights reflected by the first dichroic mirror 17 are incident upon a first metal film reflection mirror 18 and deflected by 90 degrees by the mirror 18 to reach a second dichroic mirror (color separation optical system) 19. The second dichroic mirror 19 allows the R light to pass therethrough. As a result, the R light enters a reflection type liquid crystal panel assembly 30R for R light. On the other hand, the second dichroic mirror 19 reflects the G light to change the proceeding direction thereof by 90 degrees toward a reflection type liquid crystal panel assembly 30G for G light.

The B light that has passed through the first dichroic mirror 17 is reflected by a second metal film reflection mirror 20 and then by a third metal film reflection mirror 21 to enter a reflection type liquid crystal panel assembly 30B for B light.

As apparent from the foregoing, the first dichroic mirror 17 and the second dichroic mirror 19 constitute a color separation optical system that separates the white light from the light source 11 into R, G, and B lights. Also, each constituting member ranging from the light source 11 to the color separation optical system 17, 19 constitutes illumination unit respectively for R, G, and B lights that serves to illuminate the reflection type liquid crystal panel (the reflection type spatial light modulation element) 33.

By the way, the first embodiment describes where the white light from the light source 11 is color-separated into R, G, and B lights by the color separation optical systems 17, 19. However, the present invention is not necessarily limited to this embodiment. The projection display apparatus according to the present invention can be embodied with light emitting diode (LED) light sources respectively for R, G, and B lights in place of the color separation optical systems 17, 19 and the white light source 11. In such a display apparatus, the R, G, and B lights respectively emitted from the LED light sources are polarized to one direction polarization (first polarization) light and then radiated respectively on the reflection type liquid crystal panels 33 for R, G, and B lights. Namely, the LED light sources serve as the illumination unit, which is also applicable to the subsequent embodiments 2 to 4.

The reflection type liquid crystal panel assembles 30R, 30G, 30B respectively for R, G, and B lights all have the same configuration and oppose incident surfaces 40a, 40b, 40c of a three-color combination cross dichroic prism 40, respectively, leaving a predetermined distance therebetween.

The reflection type liquid crystal panel assemblies 30R, 30G, 30B and the three color combination cross dichroic prism 40 are attached on a base 25 made for example of aluminum or the like by an adhesive as illustrated in FIG. 4.

Figure 1:
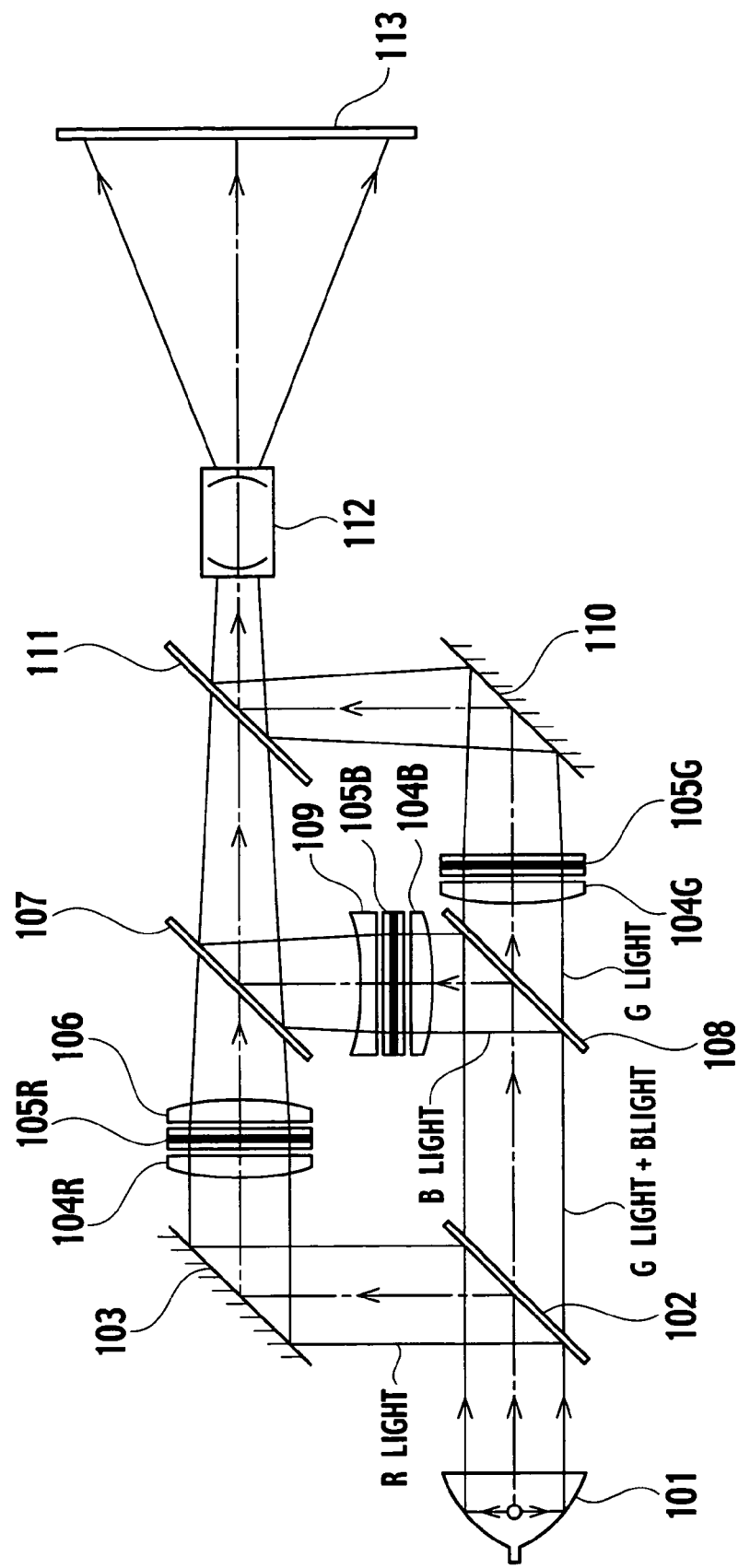
FIG. 1 is a schematic view of a related art projection display apparatus.
Figure 2A:
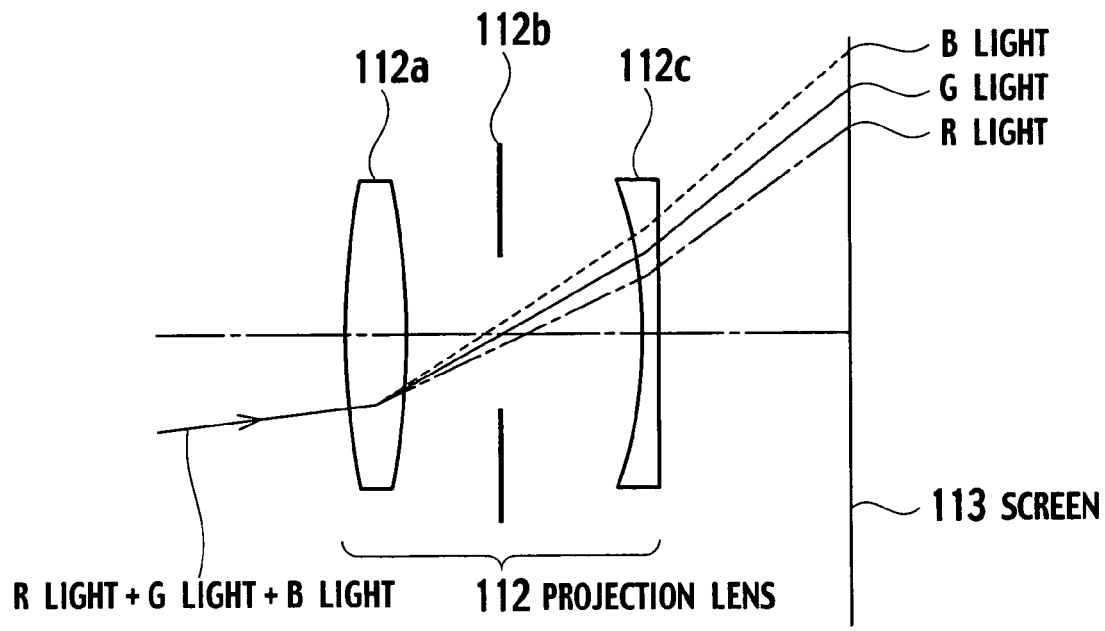
FIGS. 2A and 2B are a view for explaining how a lateral chromatic aberration occurs on a screen when R, G, and B lights are projected by a projection lens in the related art projection display apparatus.
Figure 2B:
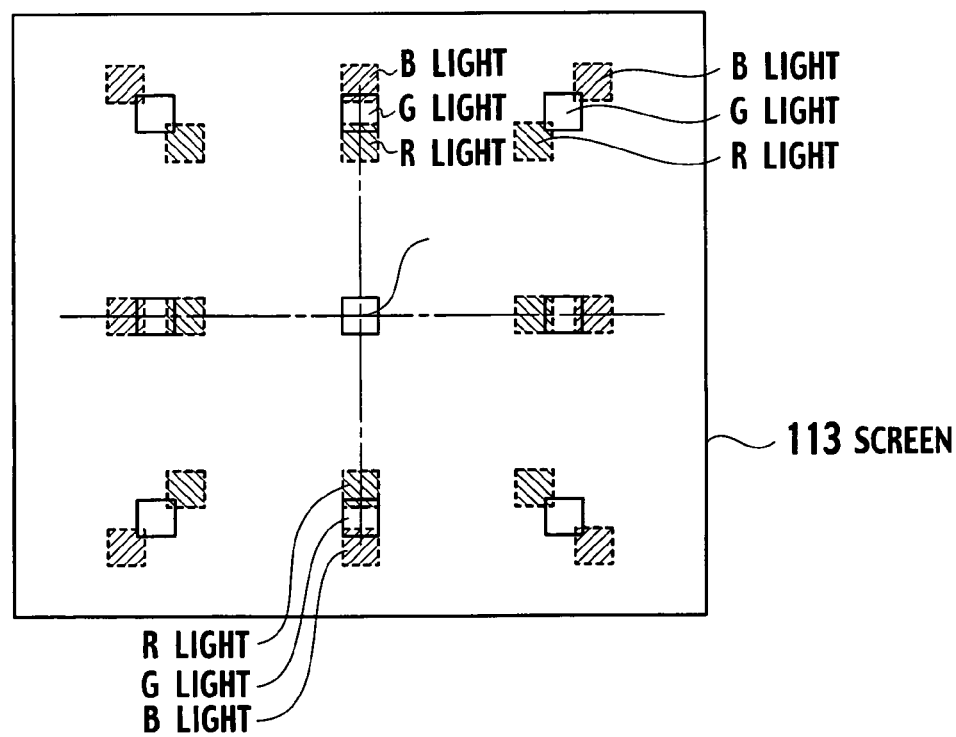

In addition, the reflection type liquid crystal panel assemblies 30R, 30G, 30B each are configured into a shape of a right-angle triangular-based hollow housing (referred to as a housing, hereinafter) 31 defined by an upper plane 31b, a lower plane 31a, both of which are formed of sheet metal into a shape of a right-angle triangle, a first surface 31c that is inclined with respect to an optical axis for each light originated by the light illumination unit composed of the parts from the light source 11 (FIG. 3) through the color separation optical systems 17, 19 (FIG. 3), a second surface 31d, and a third surface 31e. The second surface 31d and the third surface 31e are connected at one edge thereof so that the two surfaces 31d, 31e define a right angle therebetween. In addition, two edges parallel with the one edge of the connected surfaces 31d, 31e meet both edges of the first surface 31c, respectively, so as to make a triangular column, as shown in FIG. 2.

There is attached a wire grid polarizer 32 by an adhesive on the first surface 31c that is arranged so as to be inclined at an angle of 45 degrees with respect to the optical axis of the light originated from the light illumination unit composed of the parts from the light source 11 (FIG. 3) through the color separation optical systems 17, 19 (FIG. 3) and is a constituting part of the housings 31 which are provided respectively for R, G, and B lights. The wire gird polarizer 32 serves to allow the first-polarization light included in the R, G, or B lights coming from the light illumination unit to pass therethrough and reflect a second-polarization light that has been produced by the reflection type liquid crystal panel (reflection type spatial light modulation element) 33 when the first-polarization light is incident thereon and reflected back to the wire grid polarizer 32.

In addition, the reflection type liquid crystal panel 33 is attached by an adhesive using an aperture mask 34 on the second surface 31d that is arranged so as to be perpendicular to the optical axis of the first polarization light passing through the wire grid polarizer 32.

In addition, there is attached a transmission type polarizing plate 36 by an adhesive on the third surface 31e that is arranged so as to be perpendicular to the optical axis of the second polarization light reflected by the reflection type liquid crystal panel 33 and then the wire grid polarizer 32. The transmission type polarizing plate 36 serves to exclude unwanted first-polarization light included in the light reflected by the wire grid polarizer 32 and to allow the second-polarization light to pass therethrough.

In other words, the wire grid polarizer 32 is adhered on the first surface 31c, which is inclined at an angle of 45 degrees, of the housing 31; the reflection type liquid crystal panel 33 is adhered on the second surface 31d that is one of the two surfaces disposed respectively on both edges of the first surface 31c; and the transmission type polarization plate 36 is adhered on the third surface 31e that is perpendicular to the second surface 31d.

By the way, the aforementioned right-angle triangular prism housing does not necessarily take the shape as stated previously. Namely, while the first surface 31c having the wire grid polarizer 32 adhered thereon has to be inclined at an angle of 45 degrees with respected the second surface 31d having the reflection type liquid crystal panel 33 adhered thereon, the angle between the second surface 31d and the third surface 31e is not necessarily limited to 90 degrees, as far as the second-polarization light that has been reflected by the wire grid polarizer 32 adhered on the first surface 31c can pass through the third surface 31e.

The inside space of the housing 31 defined by the lower plane 31a, the upper plane 31b, the first surface 31c, the second surface 31d, and the third surface 31e is preferably filled with inert gas such as but not limited to nitrogen or argon at a pressure of 1 atmosphere (101.325 kPa) or higher, which is easily carried out by using a lid 45 provided in the upper plane 31b, and sealed airtight. Since the housing 31 is gas-pressurized and kept airtight, dust and dirt can be prevented from entering the housing 31. The housing 31 being kept airtight is arranged so that the transmission type polarizing plates 36 respectively for R, G, and B lights oppose the incident faces 40a, 40b, 40c of the three-color combination cross dichroic prism 40, respectively, leaving a predetermined distance therebetween.

By the way, the wire grid polarizers 32, the reflection type liquid crystal panels 33, and the transmission type polarizing plates 36, all of which are provided on the housings 31 respectively for R, G, and B lights, are provided upright on the base 25.

In addition, the reflection type liquid crystal panel 33 is fitted into an opening of the aperture mask plate 34 that defines the position thereof and thus provided integrally on the housing 31 and on the back face of the reflection liquid crystal panel 33 is provided a heat sink 35 for releasing heat. By the way, the reflection liquid crystal panel 33 may be adhered directly on the second surface 31d by an adhesive without using the aperture mask plate 34.

When the R light of P-polarization (the first polarization) enters the reflection type liquid crystal panel assembly 30R for R light, the R right passes through the wire grid polarizer 32 attached on the first surface 31c of the housing 31 and then reaches the reflection type liquid crystal panel 33 for R light.

The aforementioned wire grid polarizer 32 is a sort of a plate-shaped reflection type polarizing plate serving as a polarization separator for separating polarization component from the light emitted from the light source 11 (FIG. 3). As illustrated in FIG. 5A, the wire grid polarizer 32 is configured in a way that a plurality of metal lines 32b made of Aluminum or the like are formed on an optical glass plate 32a so as to be arranged into a stripe with intervals of about 140 nm between each line. The wire grid polarizer 32 has a function that allows light having a polarization perpendicular to the metal lines 32b (for example, P-polarized light) to pass therethrough and reflects light having a polarization parallel to the metal lines 32b (for example, S-polarized light).

FIG. 5C illustrates a wavelength dependence of transmittance of P-polarization component, taking as a parameter of a light-incident angle θ (FIG. 5B) in relation to the wire grid polarizer 32. In FIG. 5C, lines "a", "b", and "c" indicate the dependence when the incident angles θ are 0, −15, and +15 degrees, respectively. The light-incident angle θ is defined as an angle of the incoming light with respect to an optical axis against which the incident surface of the wire grid polarizer 32 is inclined at an angle of 45 degrees. In the wire grid polarizer 32, even when the incident angle θ deviates from the optical axis by +/−15 degrees, the transmittance of the P-polarized light does not depend greatly on the wavelength of the light, which is indicative of a high stability, as shown in FIG. 5C.

Therefore, it has been found that the use of the wire grid polarizer 32 realizes a bright image having a high color-reproducibility. In addition, the wire grid polarizer 32 provides an advantage of lightweight because it is configured into a shape of plate. Moreover, the wire grid polarizer 32 is capable of preventing image quality degradation caused by birefringence since the polarizer 32 is not likely to absorb the light emitted from the light source 11 (FIG. 3).

Referring back to FIGS. 3 and 4, when the R light of P-polarization (the first polarization) that has passed through the wire grid polarizer 32 for R light is incident upon the reflection type liquid crystal panel 33 for R light, the R light is light-modulated by the reflection type liquid crystal panel 33 for R light in accordance with an image signal for R light, the signal being applied to the liquid crystal panel 33, and then reflected back to reach the wire grid polarizer 32 for R light. In this case, the wire grid polarizer 32 for R light reflects only the R light of S-polarization (the second polarization), which is produced when the R light of P-polarization (the first polarization) is incident upon and light-modulated by the reflection type liquid crystal panel 33 for R light.

By the way, the reflection type liquid crystal panel 33 is composed of a plurality of switching elements arranged into a matrix on a silicon substrate, a plurality of pixel electrodes respectively arranged above the matrix switching elements with an insulating layer therebetween, liquid crystal filled between the plurality of pixel electrodes and a common electrode provided on a transparent substrate. When a voltage is applied across the plurality of pixel electrodes and the common electrode, the light incident upon the incident surface from the transparent substrate is light-modulated in accordance with an image signal and then reflected by the plurality of pixel electrodes as image light. As is configured above, the reflection type liquid crystal panel 33 is called a reflection type liquid crystal panel. The reflection type liquid crystal panel 33 having enjoys a high degree of pixel integration and thus is suitable to project high-resolution image. In addition, since circuits can be integrated underneath the plurality of pixel electrodes, an aperture ratio can be increased up to about 90%, thereby offering an advantage of a bright, smoothly rendered, and highly-defined image.

The R light of S-polarization that has been reflected by the wire grid polarizer 32 for R light is then incident upon the transmission type polarizing plate 36 which is arranged in the housing 31 for R light so as to oppose the three-color combination cross dichroic prism 40 and serves as means for excluding unwanted polarized light. Due to the transmission type polarizing plate 36, the unwanted R light of P-polarization (the first polarization) existing in the incident light is excluded and thus only the R light of S-polarization passes therethrough. After this, the R light of S-polarization (the second polarization) is incident upon the incident surface 40a of the three-color combination cross dichroic prism 40.

By the way, if P-polarized light remains in the light that has been reflected by the wire grid polarizer 32, it reduces a contrast ratio of the image to be projected. This is why the transmission type polarizing plate 36 is provided as means for excluding the unwanted P-polarized light.

The transmission type polarizing plate 36 is configured by staining a base film (for example, one made of polyvinyl alcohol (PVA)) with a dichroic material such as but not limited to iodine or organic dye, drawing the stained film to be oriented to develop absorption dichroic properties, sandwiching the PVA polarization layer with triacetylcellulose (TAC) films to obtain a polarization film, and attaching the polarization film on a glass substrate with a cohesion or adhesion agent. The transmission type polarizing plate 36 based upon the absorption dichroic properties absorbs the light having one polarization direction that is the same as the orientation of the chromatic dye and allows the light having the other polarization direction to pass therethrough.

Since the transmission type polarizing plate 36 is configured as an absorption type, it is preferably manufactured using a substrate having a high thermal conductivity, for example, a substrate made of quartz or sapphire, taking heat resistance and heat dissipation into consideration. In order to improve a utilization rate of light and to prevent image quality from being deteriorated by unwanted reflection taking place in a boundary face between the transmission type polarizing plate 36 and air, an anti-reflection coating is necessary in the boundary. When providing an anti-reflection coating, polarization properties and anti-reflection properties have to be optimized preferably for R, G, and B lights.

The transmission type polarizing plate 36 may be made of a single-sided film. However, since it is difficult to planarize the surface of the film to an order of wavelength while irregularity of the film surface deteriorates an image resolution, it is preferable to realize a higher resolution of the image that the polarization film is sandwiched by substrates that have been polished to optical grade smoothness, the substrate being made of for example highly transmitting glass, optical glass, crystalline quartz, quartz and sapphire, and the irregularity is filled with a cohesion and adhesion agent. With these counter measures, the image resolution is prevented from degrading.

While the above explanation is mainly centered on the reflection type liquid crystal panel assembly 30R for R light, the same is applicable for the reflection type liquid crystal panel assemblies 30G, 30B. Namely, when the G (B) light is incident on the reflection type liquid crystal panel assembly 30G (30B), the light is light-modulated and reflected to become S-polarized G (B) light by the reflection type liquid crystal panel 33 (33) for G (B) light and then is incident upon the incident surface 40b (40c) of the three-color combination cross dichroic prism 40 (40).

R, G, and B image lights (or, light-modulated lights) incident respectively upon the incident surfaces 40a, 40b, 40c are color-composed by a first dichroic film 40e and a second dichroic film 40f, both of which are formed inside the three-color combination cross dichroic prism 40. Then, the color-composed light produced by the three-color combination cross dichroic prism 40 exits out from an exit plane 40d and enters a projection lens 42 after passing through ¼ wavelength plate 41. By the projection lens 42, the color-composed light is magnified and projected on a screen (not shown).

The above-mentioned three-color combination cross dichroic prism 40 is formed of transparent optical grade glass into a shape of rectangular solid or cuboid. When seen from above, the first dichroic film 40e and the second dichroic film 40f crisscross with each other in an "X" shape.

The first dichroic film 40e of the three-color combination cross dichroic prism 40 reflects the R light incoming from the incident surface 40a so as to change the proceeding direction thereof by 90 degrees to allow the reflected light to exit from the exit plane 40d. In addition, the first dichroic film 40e allows the G light incoming from the incident surface 40b to pass therethrough and then to exit from the exit plane 40d. Moreover, the first dichroic film 40e allows the B light incoming from the incident surface 40c to pass therethough.

The second dichroic film 40f of the three-color combination cross dichroic prism 40 reflects the B light incoming from the incident surface 40c to change the proceeding direction thereof by 90 degrees to allow the reflected light to exit from the exit plane 40d. In addition, the first dichroic film 40f allows the G light incoming from the incident surface 40b to pass therethrough and then to exit from the exit plane 40d. Moreover, the first dichroic film 40f allows the R light incoming from the incident surface 40a to pass therethough.

Therefore, three-color combination is carried out by the first and the second dichroic film 40e, 40f formed inside the three-color combination cross dichroic prism 40.

By the way, the ¼ wavelength plate 41 is provided, if needed, between the three-color combination cross dichroic prism 40 and the projection lens 42 in order to prevent unnecessary light from appearing as ghost. The ghost is generated in such a way that a little amount of light is reflected by the surface of the projection lens 42 to return to the reflection type liquid crystal panel 33 by way of the three-color combination cross dichroic prism 40, the transmission type polarizing plate 36, and the wire grid polarizer 32 in this order, and then is reflected by the panel 33 to reach all the way back to the screen.

Next, referring to FIGS. 6 to 17, there will be explained a configuration for reducing the lateral chromatic aberration of R, G, and B image light on a projection plane such as a screen (not shown) in the reflection type projection display apparatus 10A according to the first embodiment in which the R, G, and B image lights that have been produced in accordance with image signals respectively for R, G, and B lights and reflected by the reflection type liquid crystal panels 33 respectively for R, G, and B lights proceed through the wire grid polarizer 32, the transmission type polarizing plate 36, and the three-color cross dichroic prism 40 in this order and is projected by the projection lens 42 on the projection plane.

FIGS. 6A, 6B, 7A and 7B illustrate lateral chromatic aberration characteristics of R and B lights occurring on a screen (projection plane) in relation to G light as a reference level (a center axis). In these figures, the horizontal axis represents a value of Lateral Color (mm) that is indicative of a lateral chromatic aberration value, and the vertical axis represents a Filde value normalized by a distance between the center point of a rectangular screen and a corner thereof.

Figure 6A:
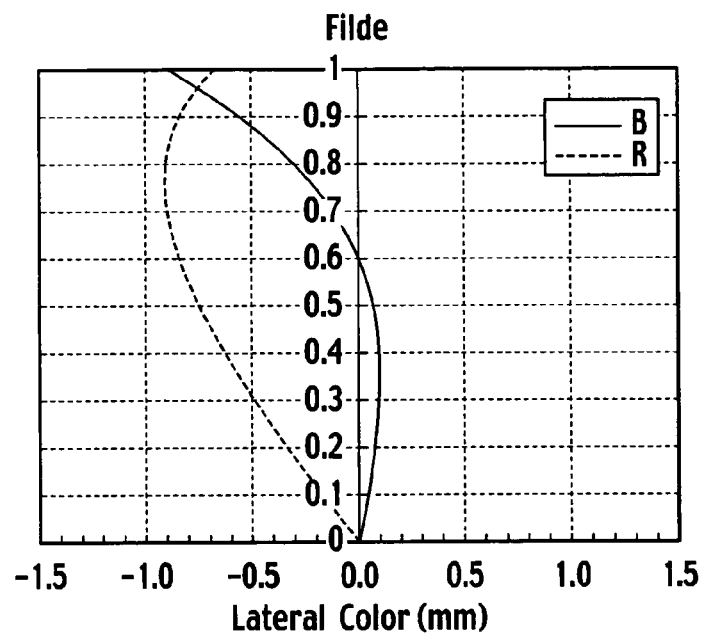
FIG. 6A illustrates a pre-correction lateral chromatic aberration characteristic 1A on a screen.
Figure 7A:
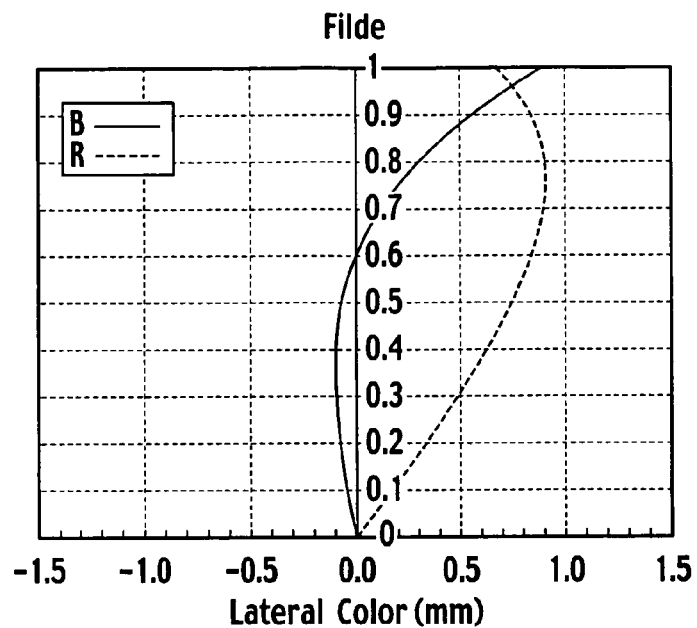
FIG. 7A illustrates a pre-correction lateral chromatic aberration characteristic 2A on a screen.

Before correcting, the lateral chromatic aberration is represented as either a lateral chromatic aberration characteristic 1A illustrated in FIG. 6A or a lateral chromatic aberration characteristic 2A illustrated in FIG. 7A, the latter of which may be obtained by flipping the characteristic 1A around the center axis, depending on a configuration of the projection lens 42 (FIGS. 3 and 4), as explained in the related art section.

Namely, in the lateral chromatic aberration characteristic 1A illustrated in FIG. 6A before correction, the R light has a Lateral Color that deviates toward the "−" region when a Filde value ranges from 0 to 1 and the R light has a Lateral Color that deviates only slightly toward the "+" region when a Filde value ranges from 0 to 0.6 and comes to deviate to a greater extent toward the "−" region as a Filde value increases from 0.6 to 1, the Lateral Color being taken with respect to the G light as a reference. Such a characteristic is inherent to minus type lateral chromatic aberration.

Figure 6B:
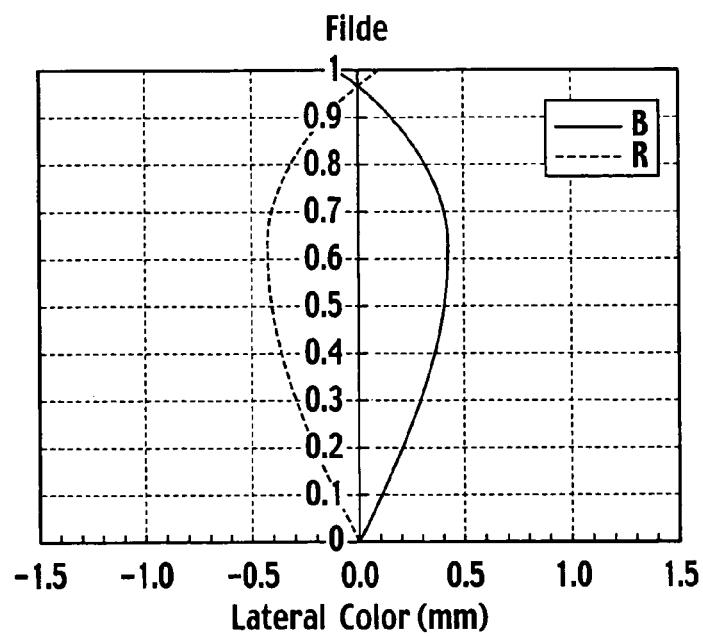
FIG. 6B illustrates a post-correction lateral chromatic aberration characteristic 1B on a screen.

In order to correct the aforementioned lateral chromatic aberration characteristic 1A, any one of correction configurations 1 and 2 (FIGS. 9 and 10) by the wire grid polarizer 32 and correction configurations 5 and 6 (FIGS. 14 and 15) by the transmission type polarizing plate 36, which will be explained in detail hereinafter, can be employed to obtain corrected lateral chromatic aberration characteristic 1B on the screen as illustrated in FIG. 6B. As illustrated in FIG. 6B, both the solid line representing a Lateral Color of the R light in the "−" region and the dotted line representing a Lateral Color of the B light in the "+" region are symmetrical with respect to the center axis. In addition, the Lateral Colors for both lights does not exceed an absolute value of 0.5, which indicates that the lateral chromatic aberration on the screen is corrected sufficiently to a degree that does not cause a problem in practical use.

Additionally, in the lateral chromatic aberration characteristic 2A illustrated in FIG. 7A before correction, the R light has a Lateral Color that deviates toward the "+" region when a Filde value ranges from 0 to 1 and the R light has a Lateral Color that deviates only slightly toward the "−" region when a Filde ranges from 0 to 0.6 and comes to deviate to a greater extent toward the "+" region as a Filde value increases from 0.6 to 1, the Lateral Color being taken with respect to the G light as a reference. Such a characteristic is inherent to plus type lateral chromatic aberration.

Figure 7B:
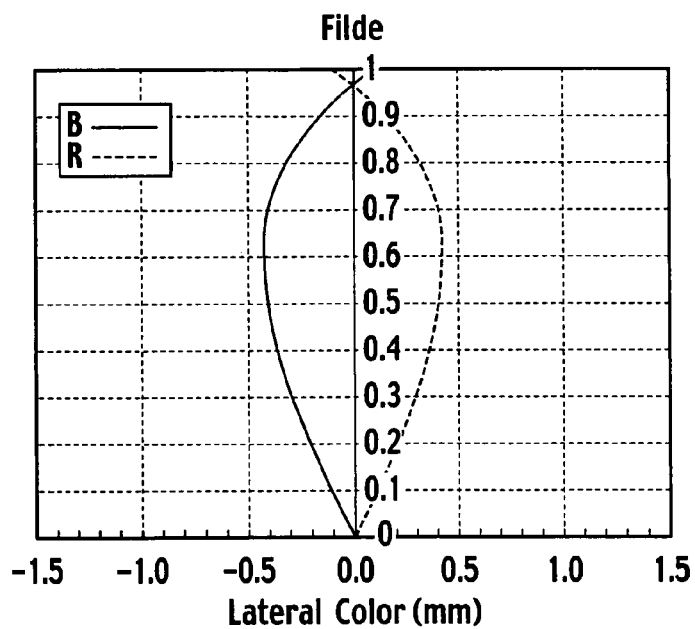
FIG. 7B illustrates a post-correction lateral chromatic aberration characteristic 2B on a screen.

In order to correct the lateral chromatic aberration characteristic 2A, any one of correction configurations 3, 4 (FIGS. 11, 12) by the wire grid polarizer 32 and correction configurations (FIGS. 16 and 17) by the transmission type polarizing plate 36, which will be explained in detail hereinafter, can be employed to obtain corrected lateral chromatic aberration characteristic 2B on the screen as illustrated in FIG. 7B. As illustrated in FIG. 7B, the solid line representing a Lateral Color of the R light in the "+" region and the dotted line representing a Lateral Color of the B light in the "−" region are symmetrical with respect to the center axis. In addition, the Lateral Colors for both lights do not exceed an absolute value of 0.5, which indicates that the lateral chromatic aberration on the screen is corrected sufficiently to a degree that does not cause a problem in practical use.

In the first embodiment, optical correction for reducing the lateral chromatic aberration on the projection plane (screen) is exhibited by the wire grid polarizer 32 or the transmission polarizing plate 36, as described hereinafter.

When the wire gird polarizer 32 to correct the reflected light therefrom to reduce the lateral chromatic aberration, the following 4 correction configurations 1 to 4 (FIG. 9 to 12) can be employed. On the other hand, when the transmission polarizing plate 36 to correct the transmitting light therethrough to reduce the lateral chromatic aberration, after-mentioned 4 correction configurations 5 to 8 (FIG. 14 to 17) can be employed.

Figure 8A:
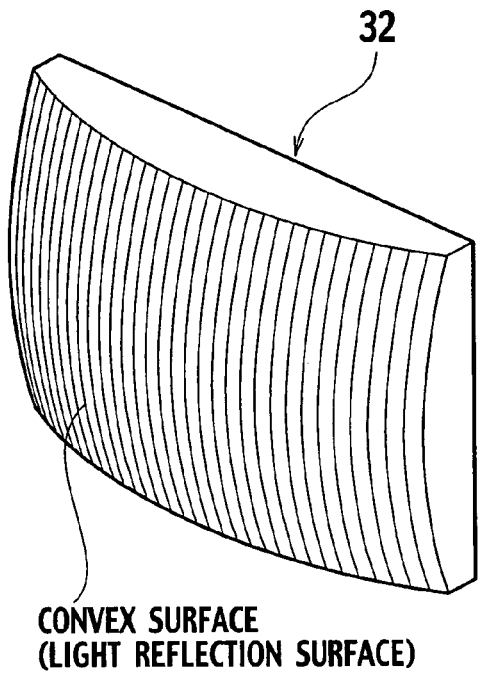
FIG. 8A is a perspective view of a wire grid polarizer 32 having a convex surface.
Figure 8B:
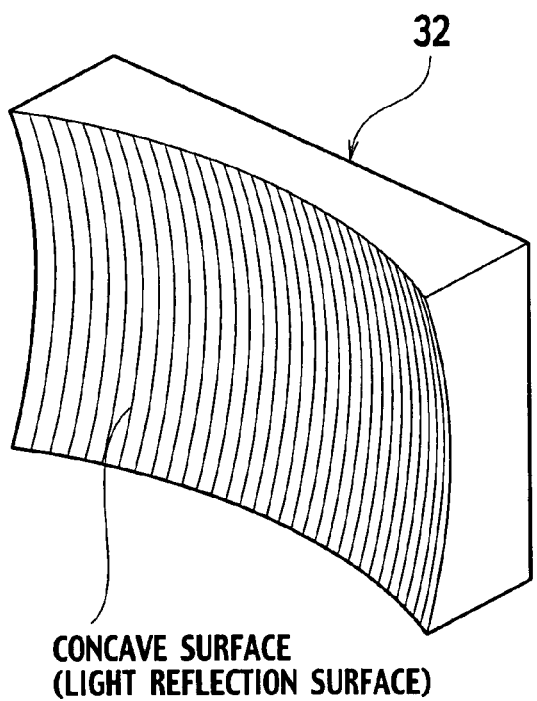
FIG. 8B is a perspective view of a wire grid polarizer 32 having a concave surface.

Firstly, when the lateral chromatic aberration on the projection plane (screen) is corrected for reduction using the wire grid polarizer 32 in the first embodiment, the reflection surface for reflecting the R, G, and B image lights coming from the reflection type liquid crystal panels 33 respectively for R, G, and B lights has to be shaped convexly or concavely as illustrated in FIG. 8A or 8B.

When the wire grid polarizer 32 having a convex-shaped reflection surface as illustrated in FIG. 8A is used, the reflection surface serves as a mirror having a negative refracting power to the incoming light. Therefore, the image obtained by the use of the wire grid polarizer 32 illustrated in FIG. 8A becomes smaller than an image obtained by the use of a wire grid polarizer having a flat light reflection surface.

On the other hand, when the wire grid polarizer 32 having a concave-shaped reflection surface as illustrated in FIG. 8B, the reflection surface serves as a mirror having a positive refracting power to the incoming light. Therefore, the projected image obtained by the use of the wire gird polarizer 32 becomes larger than an image obtained by the use of a wire grid polarizer having a flat light reflection surface.

Consequently, when the reflection surface of at least one of the wire grid polarizers 32 respectively for R, G, and B lights is formed in a shape of concave or convex in accordance with the lateral chromatic aberration characteristic of the projection lens 42 (FIGS. 3 and 4) in order to correct for the reduction of the lateral chromatic aberration, the projected image created by at least one light having passed through such a wire grid polarizer 32 can be so adjusted as to have the same dimensions as those of a projected image created by other lights on the projection plane. Namely, it is possible to correct for the reduction of the lateral chromatic aberration on the projection screen in this manner.

Next, the correction configurations 1 to 4 that correct for the reduction of the lateral chromatic aberration by adjusting a shape of the reflection surface (image creating surface) of the wire grid polarizer 32 will be described in detail referring to FIGS. 9 to 12. In these figures, "r" represents a curvature radius and "f" represents a focus length. By the way, "+" and "−" signs in the focus length indicate a concave surface and a convex surface, respectively.

As illustrated in FIGS. 9A to 9D, in the correction configuration 1, the wire grid polarizer 32 for R light has a flat light reflection surface (r=infinite); the wire grid polarizer 32 for G light has a convex light reflection surface having a curvature radius r of 28740 mm and a focus length f of −14370 mm, for example; and the wire grid polarizer 32 for B light a flat light reflection surface (r=infinite), when the projection lens 42 (FIGS. 3 and 4) used has the aforementioned minus lateral chromatic aberration characteristic 1A illustrated in FIG. 6A. This configuration enables the center axis to be equivalently relocated between the lateral chromatic aberration curves for R and B lights in FIG. 6A, thereby realizing the lateral chromatic aberration characteristic comparable to that illustrated in FIG. 6B. Namely, this configuration is able to correct for the reduction of the lateral chromatic aberration on the projection plane.

As illustrated in FIGS. 10A to 10D, in the correction configuration 2, the wire grid polarizer 32 for R light adhered on the housing 31 of the reflection type liquid crystal panel assembly 30R for R light has a concave light reflection surface having a curvature radius r of 12998 mm and a focus length f of +6499 mm, for example; the wire grid polarizer 32 for G light adhered on the housing 31 of the reflection type liquid crystal panel assembly 30G for G light has a flat light reflection surface (r=infinite); and the wire grid polarizer 32 for B light adhered on the housing 31 of the reflection type liquid crystal panel assembly 30B for B light has a concave light reflection surface having a curvature radius r of 9210 mm and a focus length f of +4605 mm, for example, when the projection lens 42 (FIGS. 3 and 4) used has the aforementioned lateral chromatic aberration characteristic 1A illustrated in FIG. 6A as is the case with the above correction configuration 1. This configuration corrects the lateral chromatic aberrations of R and B lights, without shifting the center axis, thereby realizing the lateral chromatic aberration characteristic comparable to that illustrated in FIG. 6B. Namely, this configuration is able to correct for the reduction of the lateral chromatic aberration on the projection plane.

As illustrated in FIGS. 11A to 11D, in the correction configuration 3, the wire grid polarizer 32 for R light has a flat light reflection surface (r=infinite); the wire grid polarizer 32 for G light has a concave light reflection surface having a curvature radius r of 28740 mm and a focus length f of +14370 mm, for example; and the wire grid polarizer 32 for B light has a flat light reflection surface (r=infinite), when the projection lens 42 (FIGS. 3 and 4) used has the aforementioned plus lateral chromatic aberration characteristic 2A illustrated in FIG. 7A, as is not the case with the above correction configurations 1 and 2. This configuration enables the center axis to be equivalently relocated between the lateral chromatic aberration curves for R and B lights in FIG. 6A, thereby realizing the lateral chromatic aberration characteristic comparable to that illustrated in FIG. 6B. Namely, this configuration is able to correct for the reduction of the lateral chromatic aberration on the projection plane.

As illustrated in FIGS. 12A to 12D, in the correction configuration 4, the wire grid polarizer 32 for R light has a convex light reflection surface having a curvature radius r of 12998 mm and a focus length f of −6499 mm, for example; the wire grid polarizer 32 for G light has a flat light reflection surface (r=infinite); and the wire grid polarizer 32 for B light has a concave light reflection surface having a curvature radius r of 9210 mm and a focus length f of −4605 mm, for example, when the projection lens 42 (FIGS. 3 and 4) used has the aforementioned lateral chromatic aberration characteristic 2A illustrated in FIG. 7A, as is the case with the correction configuration 3. This configuration corrects the lateral chromatic aberrations of R and B lights, without shifting the center axis, thereby realizing the lateral chromatic aberration characteristic comparable to that illustrated in FIG. 7B. Namely, this configuration is able to correct for the reduction of the lateral chromatic aberration on the projection plane.

Next, when the transmission type polarizing plate 36 is utilized to correct for the reduction of the lateral chromatic aberration on the projection plane, the transmission type polarizing plate 36 has to have a convex (FIG. 13A) or concave (FIG. 13B) light transmission surface that allows the R, G, and B image lights reflected by the reflection type liquid crystal panels 33 respectively for R, G, and B lights and then by the wire gird polarizers 32 respectively for R, G, and B lights to pass therethrough. Although the convex or concave surface illustrated in FIGS. 13A and 13B can be either a light incident surface or a light exit surface of the transmission type polarizing plate 36, FIGS. 14 to 17 illustrate where the light incident surface thereof is convexly or concavely shaped.

Figure 13A:
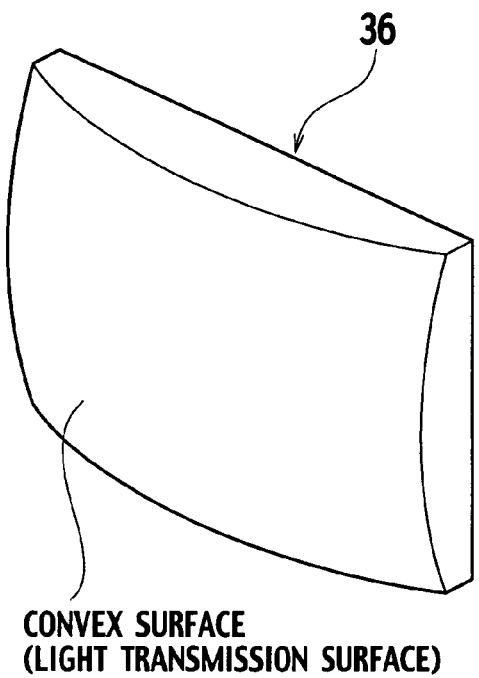
FIG. 13A is a perspective view of a transmission type polarizing plate 36 having a convex surface.

The transmission type polarizing plate 36 having a convex light transmission surface illustrated in FIG. 13A serves as a lens having a positive refracting power to the light transmitting therethrough. Therefore, the projected image obtained by the use of such a transmission type polarizing plate 36 becomes larger than an image obtained by the use of a transmission type polarizing plate having a flat light transmission surface.

Figure 13B:
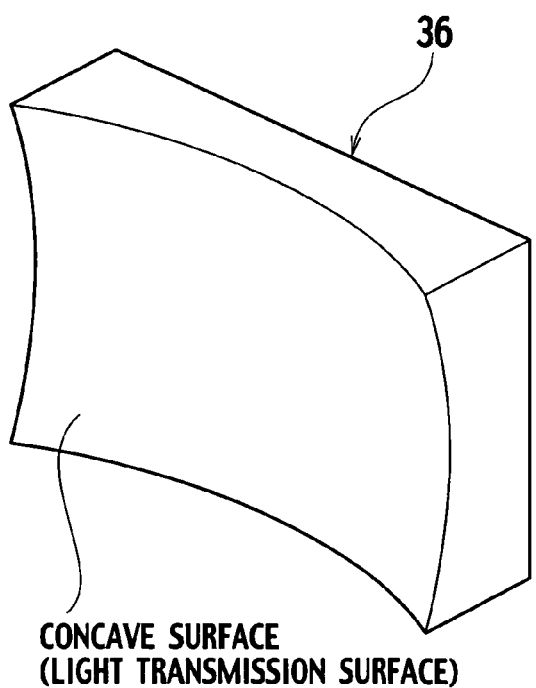
FIG. 13B is a perspective view of a transmission type polarizing plate 36 having a concave surface.

On the other hand, the transmission type polarizing plate 36 having a concave light transmission surface illustrated in FIG. 13B serves as a lens having a negative refracting power to the light transmitting therethrough. Therefore, the projected image obtained by the use of such a transmission type polarizing plate 36 becomes smaller than an image obtained by the use of a transmission type polarizing plate having a flat light transmission surface.

As mentioned above, the transmission type polarizing plate 36 having a convex (concave) transmission surface exhibits a positive (negative) refracting power to the light transmitting therethrough, whereas the wire grid polarizer 32 having a convex (concave) reflection surface exhibits the opposite refracting power to the light to be reflected. Accordingly, the transmission type polarizing plate 36 having a convex (concave) transmission surface magnifies (demagnifies) the image to be projected, whereas the wire grid polarizer 32 having a convex (concave) reflection surface demagnifies (magnifies) the image to be projected.

Consequently, since the transmission surface of at least one of the transmission type polarizing plates 36 respectively 36 for R, G, and B lights is formed in a shape of concave or convex in accordance with the lateral chromatic aberration characteristic of the projection lens 42 (FIGS. 3 and 4) in order to correct for the reduction of the lateral chromatic aberration, the projected image created by at least one light having passed through such a transmission surface can be so adjusted as to have the same dimensions as those of a projected image created by other lights on the projection plane. Namely, it is possible to correct for the reduction of the lateral chromatic aberration on the projection screen in this manner.

Next, the correction configurations 5 to 8 that correct for the reduction of the lateral chromatic aberration by adjusting a shape of the light transmission surface of the transmission type polarizing plate 36 will be described in detail referring to FIGS. 14 to 17. In these figures, "r" represents a curvature radius and "f" represents a focus length. By the way, "+" and "−" signs in the focus length indicate a concave surface and a convex surface, respectively.

As illustrated in FIGS. 14A to 14D, in the correction configuration 5, the transmission type polarizing plate 36 for R light adhered on the housing 31 of the reflection type liquid crystal panel assembly 30R for R light has a flat light transmission surface (r=infinite); the transmission type polarizing plate 36 for G light adhered on the housing 31 of the reflection type liquid crystal panel assembly 30G for G light has a concave light transmission surface having a curvature radius r of 8260 mm and a focus length f of −15930 mm, for example; and the transmission type polarizing plate 36 for B light adhered on the housing 31 of the reflection type liquid crystal panel assembly 30B for B light has a flat light transmission surface (r=infinite), when the projection lens 42 (FIGS. 3 and 4) used has the aforementioned minus lateral chromatic aberration characteristic 1A illustrated in FIG. 6A. This configuration enables the center axis in FIG. 6A to be equivalently relocated between the lateral chromatic aberration curves for R and B lights, thereby realizing the lateral chromatic aberration characteristic comparable to that illustrated in FIG. 6B. Namely, this configuration is able to correct for the reduction of the lateral chromatic aberration on the projection plane.

In addition, as illustrated in FIGS. 15A to 15D, in the correction configuration 6, the transmission type polarizing plate 36 for R light has a convex light transmission surface having a curvature radius r of 9799 mm and a focus length f of +18898 mm, for example; the transmission type polarizing plate 36 for G light has a flat light transmission surface (r=infinite); and the transmission type polarizing plate 36 for B light has a convex light transmission surface having a curvature radius r of 6962 mm and a focus length f of +13427 mm, for example, when the projection lens 42 (FIGS. 3 and 4) used has the aforementioned lateral chromatic aberration characteristic 1A illustrated in FIG. 6A, as is the case with the above correction configuration 5. This configuration corrects the lateral chromatic aberrations of R and B lights, without shifting the center axis, thereby realizing the lateral chromatic aberration characteristic comparable to that illustrated in FIG. 6B. Namely, this configuration is able to correct for the reduction of the lateral chromatic aberration on the projection plane.

Additionally, as illustrated in FIGS. 16A to 16D, in the correction configuration 7, the transmission type polarizing plate 36 for R light has a flat light transmission surface (r=infinite); the transmission type polarizing plate 36 for G light has a convex light transmission surface having a curvature radius r of 8260 mm and a focus length f of +15930 mm, for example; and the transmission type polarizing plate 36 for B light has a flat light transmission surface (r=infinite), when the projection lens 42 (FIGS. 3 and 4) used has the aforementioned plus lateral chromatic aberration characteristic 2A illustrated in FIG. 7A, as is not the case with the correction configurations 5 and 6. This configuration enables the center axis in FIG. 7A to be equivalently relocated between the lateral chromatic aberration curves for R and B lights, thereby realizing the lateral chromatic aberration characteristic comparable to that illustrated in FIG. 7B. Namely, this configuration is able to correct for the reduction of the lateral chromatic aberration on the projection plane.

Moreover, as illustrated in FIGS. 17A to 17D, in the correction configuration 8, the transmission type polarizing plate 36 for R light has a concave light transmission surface having a curvature radius r of 9799 mm and a focus length f of −18898 mm, for example; the transmission type polarizing plate 36 for G light has a flat light transmission surface (r=infinite); and the transmission type polarizing plate 36 for B light has a concave light transmission surface having a curvature radius r of 6962 mm and a focus length f of −13427 mm, for example, when the projection lens 42 (FIGS. 3 and 4) used has the aforementioned lateral chromatic aberration characteristic 2A illustrated in FIG. 7A, as is the case with the correction configuration 7. This configuration corrects the lateral chromatic aberrations of R and B lights, without shifting the center axis, thereby realizing the lateral chromatic aberration characteristic comparable to that illustrated in FIG. 7B. Namely, this configuration is able to correct for the reduction of the lateral chromatic aberration on the projection plane.

According to the above correction configurations in the reflection type projection display apparatus 10A according to the first embodiment, which includes the wire grid polarizers 32 respectively for R, G, and B lights, the transmission type polarizing plates 36 respectively for R, G, and B lights, and the three-color combination cross dichroic prism (color combination optical system) 40 in this order along the light pate, since the light transmission surface of at least one wire grid polarizers 32 respectively for R, G, and B lights or the reflection surface of at least one transmission type polarizing plates 36 respectively for R, G, and B lights is convexly or concavely shaped in accordance with the lateral chromatic aberration of the projection lens 42 (FIGS. 3 and 4) in order to correct for the reduction of the lateral chromatic aberration of the image projected on the projection plane by the projection lens 42, it is possible to adjust dimensions of the image created on the screen by at least one light having passed through such a transmission surface or having been reflected by such a reflection surface to be the same as those of an image created on the screen by other lights, thereby correcting for the reduction of the lateral chromatic aberration of the image on the projection plane.

A Second Embodiment

Figure 18:
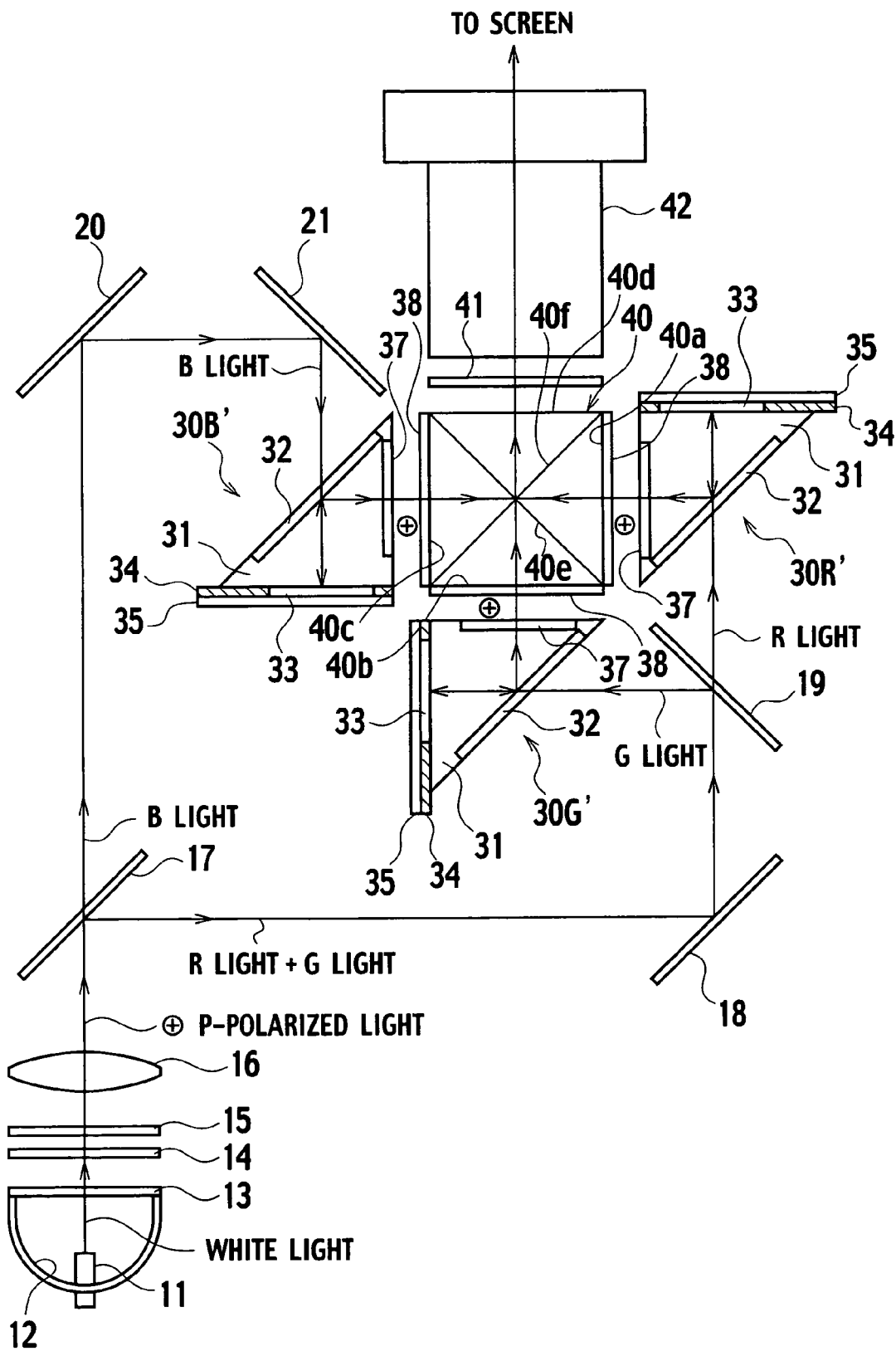
FIG. 18 is a plain view of a reflection type projection display apparatus according to a second embodiment.

FIG. 18 is a plain view of a reflection type projection display apparatus according to a second embodiment. FIG. 19 is a perspective view of reflection type liquid crystal panel assemblies respectively for R, G, and B lights, a three-color combination cross dichroic prism, and a projection lens of the reflection type projection display apparatus in FIG. 18, seen slantly upward from the reverse side of these components.

As apparent when comparing FIGS. 18 and 19 with FIGS. 3 and 4, a projection display apparatus 10B according to the second embodiment is different in construction from the projection display apparatus 10A. Namely, a projection display apparatus 10B is provided with a transparent glass plate 37 in reflection type liquid crystal panel assemblies 30R', 30G', 30B' respectively for R, G, and B lights, instead of the transmission type polarizing plate 36 used in the first embodiment, and with a transmission type polarizing plate 38 of optical absorption type attached respectively on a first incident surface 40a, a second incident surface 40b, and a third incident surface 40c of a three-color combination cross dichroic prism 40 made of transparent optical glass. The transmission type polarizing plate 38 serves as means for excluding unwanted polarized light. The following explanation is centered on the difference.

As illustrated in FIG. 19, in the projection display apparatus 10B according to the second embodiment, the reflection type liquid crystal panel assemblies 30R', 30G', 30B' respectively for R, G, and B lights each have a right-angle triangular-based hollow housing (referred to as a housing, hereinafter) 31.

Similarly with the first embodiment, a wire grid polarizer 32 is adhered by an adhesive on a first surface 31c arranged inclined at an angle of 45 degrees with respect to an optical axis of the light incoming from a light illumination unit composed of the parts from a light source 11 (FIG. 18) through a color decomposition optical system 17, 19 (FIG. 18) and a reflection type liquid crystal panel 33 is adhered by an adhesive on a second surface 31d arranged perpendicular to an optical axis of the light that has passed through the wire grid polarizer 32, by use of an aperture mask plate 34, in the housings 31 respectively for R, G and B lights.

Regarding a difference from the first embodiment, the transparent glass plates 38 are adhered by an adhesive respectively on a third surface 31e in the respective right-angle triangular prism housing 31 for R, G, and B lights, the third surface being arranged perpendicular to an optical axis of the light of the second polarization that is reflected by the wire grid polarizer 32 after having been reflected by the reflection type liquid crystal panel 33, instead of the transmission type polarizing plate 36 in the first embodiment.

Again, similarly with the first embodiment, the inside space of the right-angle triangular prism housing 31 defined by a lower plane 31a, an upper plane 31b, the first surface 31c, the second surface 31d, and the third surface 31e is preferably filled with inert gas such as but not limited to nitrogen or argon at a pressure of 1 atmosphere or higher and lower than 2 atmospheres, which is easily carried out by using a lid 45 provided in the upper plane 31b. Since the right-angle triangular prism housing 31 is airtight, dust and dirt can be prevented from entering the housing 31. The right-angle triangular prism housing 31 being kept airtight is arranged so that the transparent glass plates 38 respectively for R, G, and B lights oppose incident faces 40a, 40b, 40c of the three-color combination cross dichroic prism 40, respectively, leaving a predetermined distance therebetween.

In addition to the above configuration, the transmission type polarizing plates 38 of optical absorption type for excluding a first polarized component included in the light that has passed through the transparent glass plates 37 respectively for R, G, and B light are attached by using an adhesive respectively on the first incident surface 40a, the second incident surface 40b, and the third incident surface 40c of the three-color combination cross dichroic prism 40 that is formed of transparent optical glass.

As apparent from the foregoing, R, G, and B image lights that have been produced by the reflection type liquid crystal panels 33 respectively for R, G, and B lights and then reflected by the wire grid polarizers 32 respectively for R, G, and B lights pass through the transparent glass plates 37 respectively for R, G, and B lights. At this time, unwanted polarized light (P-polarization light) included in the image lights that has passed through the transparent glass plates 37 is excluded by the transmission type polarizing plates 38 attached on the incident surfaces 40a, 40b, 40c respectively for R, G, and B lights of the three-color combination cross dichroic prism 40. Then, the R, G, and B image lights of S-polarization are color-combined by the three-color combination cross dichroic prism 40.

Next, referring to FIGS. 20 to 27, there will be explained a configuration for reducing the lateral chromatic aberration of R, G, and B image lights on a projection plane such as a screen (not shown) in the reflection type projection display apparatus 10B according to the second embodiment, wherein the R, G, and B image lights that have been produced in accordance with image signals respectively for R, G, and B lights and reflected by the reflection type liquid crystal panels 33 respectively for R, G, and B lights proceed through the wire grid polarizer 32, the transparent glass plate 37, and the transmission type polarizing plate 38, and the three-color cross dichroic prism 40 in this order and is projected on the projection plane by the projection lens 42.

In the second embodiment, optical correction for reducing the lateral chromatic aberration on a projection plane (screen) is exhibited by any one of the wire grid polarizer 32, the transparent glass plate 37, and the transparent type polarizing plate 38, as described later.

When the wire grid polarizer 32 is utilized to correct for the reduction of the lateral chromatic aberration of the light reflected therefrom, any one of the aforementioned correction configurations 1 to 4 is preferably applicable in an appropriate manner as explained in the first embodiment with reference to FIGS. 9 to 12. Therefore, detailed description on this is omitted here.

On the other hand, when the transparent glass plate 37 is utilized to correct for the reduction of the lateral chromatic aberration of the light transmitting therethrough, the light transparent surface of at least one of the three transparent glass plates 37 respectively for R, G, and B lights is convexly or concavely shaped per the following correction configurations 9 to 12 (FIGS. 20 to 23) in accordance with the lateral chromatic aberration characteristic of the projection lens 42 (FIGS. 18 and 19). In this case, a convex light transmission surface serves as a lens having a positive refracting power to the light transmitting therethrough and a concave light transmission surface serves as a lens having a negative refracting power to the light transmitting therethrough.

In addition, when the transmission type polarizing plate 38 is utilized to correct for the reduction of the lateral chromatic aberration, the light transmission surface of at least one of the transmission type polarizing plates 38 respectively for R, G, and B lights (or, the transmission surface of one transmission type polarizing plate 30 of a particular light among the three primary lights) has to be convexly or concavely shaped per the after-mentioned correction configurations 13 to 16 (FIGS. 24 to 27) in accordance with the lateral chromatic aberration of the projection lens 42 (FIGS. 18 and 19). In this case, a convex light transmission surface serves as a lens having a positive refracting power to the light transmitting therethrough and a concave light transmission surface serves as a lens having a negative refracting power to the light transmitting therethrough.

First, correction configurations 9 to 12 that correct for the reduction of the lateral chromatic aberration by the light transmission surface of the transparent glass plate 37 will be described in detail referring to FIGS. 20 to 23. In these figures, "r" represents a curvature radius and "f" represents a focus length. By the way, "+" and "−" signs in the focus length indicate a concave surface and a convex surface, respectively. In this case, either a light incident surface or a light exit surface of the transparent glass plate 37 can be convexly or concavely shaped, although FIGS. 20 to 23 illustrate where the light incident surface thereof is so shaped.

Specifically, as illustrated in FIGS. 20A to 20D, in the correction configuration 9, the transparent glass plate 37 for R light adhered on the housing 31 of the reflection type liquid crystal panel assembly 30R' for R light has a flat light transmission surface (r=infinite); the transparent glass plate 37 for G light adhered on the housing 31 of the reflection type liquid crystal panel assembly 30G' for G light has a concave light transmission surface having a curvature radius r of 8260 mm and a focus length f of −15930 mm, for example; and the transparent glass plate 37 for B light adhered on the housing 31 of the reflection type liquid crystal panel assembly 30B' for B light has a flat light transmission surface (r=infinite), when the projection lens 42 (FIGS. 18 and 19) used has the aforementioned minus lateral chromatic aberration characteristic 1A illustrated in FIG. 6A. This configuration enables the center axis in FIG. 6A to be equivalently relocated between the lateral chromatic aberration curves for R and B lights, thereby realizing the lateral chromatic aberration characteristic comparable to that illustrated in FIG. 6B. Namely, this configuration is able to correct for the reduction of the lateral chromatic aberration on the projection plane.

In addition, as illustrated in FIGS. 21A to 21D, in the correction configuration 10, the transparent glass plate 37 for R light has a convex light transmission surface having a curvature radius r of 9799 mm and a focus length f of +18898 mm, for example; the transparent glass plate 37 for G light has a flat light transmission surface (r=infinite); and the transparent glass plate 37 for B light has a convex light transmission surface having a curvature radius r of 6962 mm and a focus length f of +13427 mm, for example, when the projection lens 42 (FIGS. 18 and 19) used has the aforementioned lateral chromatic aberration characteristic 1A illustrated in FIG. 6A, as is the case with the correction configuration 9. This configuration corrects the lateral chromatic aberrations of R and B lights without shifting the center axis, thereby realizing the lateral chromatic aberration characteristic comparable to that illustrated in FIG. 6B. Namely, this configuration is able to correct for the reduction of the lateral chromatic aberration on the projection plane.

Additionally, as illustrated in FIGS. 22A to 22D, in the correction configuration 11, the transparent glass plate 37 for R light has a flat light transmission surface (r=infinite); the transparent glass plate 37 for G light has a convex light transmission surface having a curvature radius r of 8260 mm and a focus length f of +15930 mm, for example; and the transparent glass plate 37 for B light has a flat light transmission surface (r=infinite), when the projection lens 42 (FIGS. 18 and 19) used has the aforementioned plus lateral chromatic aberration characteristic 2A illustrated in FIG. 7A, as is not the case with the above correction configurations 9 and 10. This configuration enables the center axis to be equivalently relocated between the lateral chromatic aberration curves for R and B lights in FIG. 7A, thereby realizing the lateral chromatic aberration characteristic comparable to that illustrated in FIG. 7B. Namely, this configuration is able to correct for the reduction of the lateral chromatic aberration on the projection plane.

Moreover, as illustrated in FIGS. 23A to 23D, in the correction configuration 12, the transparent glass plate 37 for R light has a concave light transmission surface having a curvature radius r of 9799 mm and a focus length f of −18898 mm, for example; the transparent glass plate 37 for G light has a flat light transmission surface (r=infinite); and the transparent glass plate 37 for B light has a concave light transmission surface having a curvature radius r of 6962 mm and a focus length f of −13427 mm, for example, when the projection lens 42 (FIGS. 18 and 19) used has the aforementioned lateral chromatic aberration characteristic 2A illustrated in FIG. 7A, as it the case with the above correction configuration 11. This configuration corrects the lateral chromatic aberrations of R and B lights without shifting the center axis in FIG. 7A, thereby realizing the lateral chromatic aberration characteristic comparable to that illustrated in FIG. 7B. Namely, this configuration is able to correct for the reduction of the lateral chromatic aberration on the projection plane.

Next, the correction configurations 13 to 16 that correct for the reduction of the lateral chromatic aberration by adjusting a shape of the light transmission surface of the transmission type polarizing plate 38 will be described in detail referring to FIGS. 24 to 27. In these figures, "r" represents a curvature radius and "f" represents a focus length. In this case, since the transmission type polarizing plate 38 is adhered on the three-color combination cross dichroic prism 40, the light incident surface thereof is convexly or concavely shaped. By the way, "+" and "−" signs in the focus length indicate a concave surface and a convex surface, respectively.

Figures 24A, 24B:
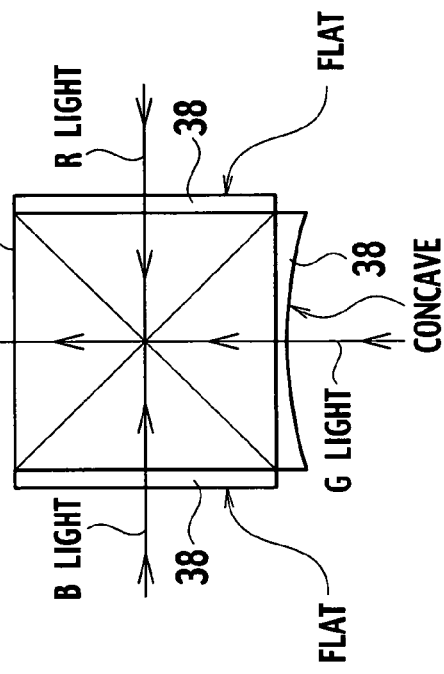
FIGS. 24A and 24B are an explanatory view of a correction configuration 13 that corrects the lateral chromatic aberration on the projection plane using a transmission type polarizing plate 38 in the second embodiment.

Specifically, as illustrated in FIGS. 24A and 24B, in the correction configuration 13, the transmission type polarizing plate 38 for R light adhered on the three-color combination dichroic prism 40 has a flat light transmission surface (r=infinite); the transmission type polarizing plate 38 for G light adhered on the three-color combination dichroic prism 40 has a concave light transmission surface having a curvature radius r of 8260 mm and a focus length f of −15930 mm, for example; and the transmission type polarizing plate 38 for B light adhered on the three-color combination dichroic prism 40 has a flat light transmission surface (r=infinite), when the projection lens 42 (FIGS. 18 and 19) used has the aforementioned minus lateral chromatic aberration characteristic 1A illustrated in FIG. 6A. This configuration enables the center axis to be equivalently relocated between the lateral chromatic aberration curves for R and B lights in FIG. 6A, thereby realizing the lateral chromatic aberration characteristic comparable to that illustrated in FIG. 6B. Namely, this configuration is able to correct for the reduction of the lateral chromatic aberration on the projection plane.

Figures 25A, 25B:
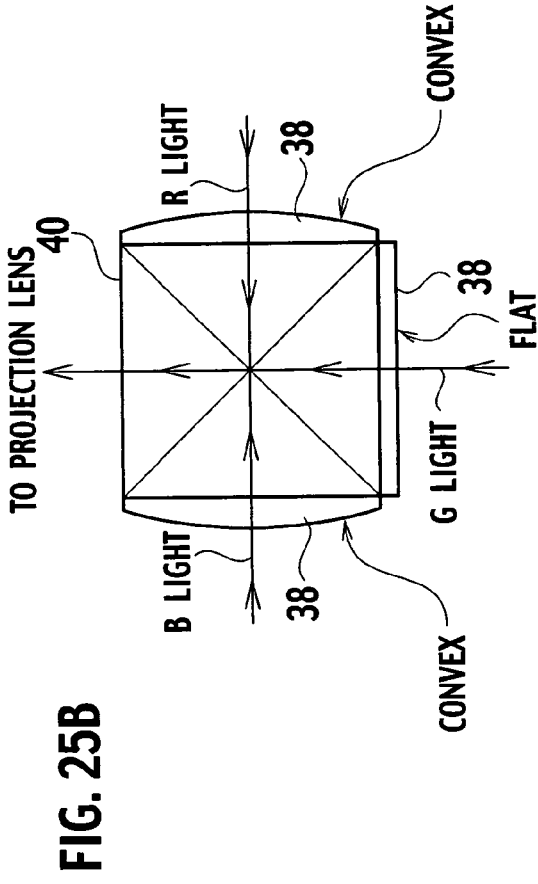
FIGS. 25A and 25B are an explanatory view of a correction configuration 14 that corrects the lateral chromatic aberration of the image on the projection plane using a transmission type polarizing plate 38 in the second embodiment.

In addition, as illustrated in FIGS. 25A and 25B, in the correction configuration 14, the transmission type polarizing plate 38 for R light has a convex light transmission surface having a curvature radius r of 9799 mm and a focus length f of +18898 mm, for example; the transmission type polarizing plate 36 for G light has a flat light transmission surface (r=infinite); and the transmission type polarizing plate 38 for B light has a convex light transmission surface having a curvature radius r of 6962 mm and a focus length f of +13427 mm, for example, when the projection lens 42 (FIGS. 18 and 19) used has the aforementioned lateral chromatic aberration characteristic 1A illustrated in FIG. 6A, as is the case with the above correction configuration 13. This configuration corrects the lateral chromatic aberrations of R and B lights without shifting the center axis, thereby realizing the lateral chromatic aberration characteristic comparable to that illustrated in FIG. 6B. Namely, this configuration is able to correct for the reduction of the lateral chromatic aberration on the projection plane.

Figures 26A, 26B:
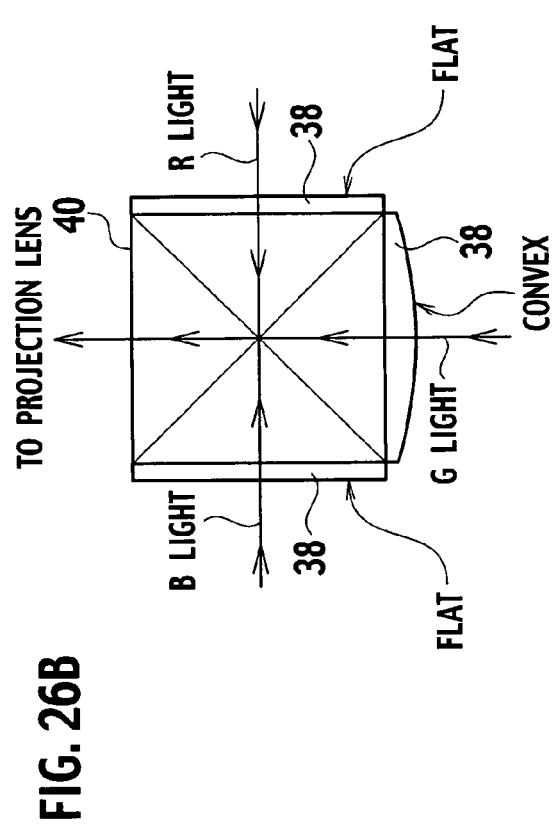
FIGS. 26A and 26B are an explanatory view of a correction configuration 15 that corrects the lateral chromatic aberration of the image on the projection plane using a transmission type polarizing plate 38 in the second embodiment.

Additionally, as illustrated in FIGS. 26A and 26B, in the correction configuration 15, the transmission type polarizing plate 38 for R light has a flat light transmission surface (r=infinite); the transmission type polarizing plate 38 for G light has a convex light transmission surface having a curvature radius r of 8260 mm and a focus length f of +15930 mm, for example; and the transmission type polarizing plate 38 for B light has a flat light transmission surface (r=infinite), when the projection lens 42 (FIGS. 18 and 19) used has the aforementioned plus lateral chromatic aberration characteristic 2A illustrated in FIG. 7A, as is not the case with the above correction configurations 13 and 14. This configuration enables the center axis to be equivalently relocated between the lateral chromatic aberration curves for R and B lights without shifting the center axis in FIG. 7A, thereby realizing the lateral chromatic aberration characteristic comparable to that illustrated in FIG. 7B. Namely, this configuration is able to correct for the reduction of the lateral chromatic aberration on the projection plane.

Figures 27A, 27B:
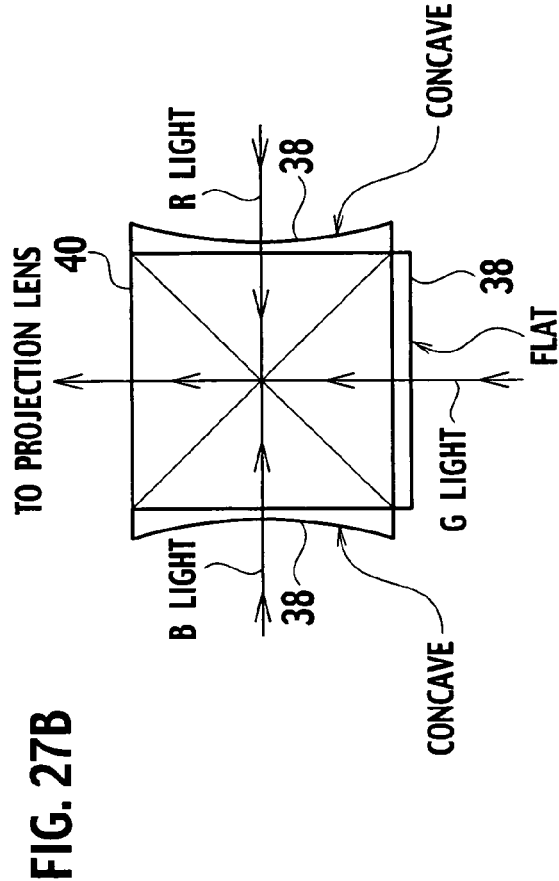
FIGS. 27A and 27B are an explanatory view of a correction configuration 16 that corrects the lateral chromatic aberration of the image on the projection plane using a transmission type polarizing plate 38 in the second embodiment.

Moreover, as illustrated in FIGS. 27A and 27B, in the correction configuration 16, the transmission type polarizing plate 38 for R light has a concave light transmission surface having a curvature radius r of 9799 mm and a focus length f of −18898 mm, for example; the transmission type polarizing plate 38 for G light has a flat light transmission surface (r=infinite); and the transmission type polarizing plate 38 for B light has a concave light transmission surface having a curvature radius r of 6962 mm and a focus length f of −13427 mm, for example, when the projection lens 42 (FIGS. 18 and 19) used has the aforementioned lateral chromatic aberration characteristic 2A illustrated in FIG. 7A. This configuration corrects the lateral chromatic aberrations of R and B lights without shifting the center axis in FIG. 7A, thereby realizing the lateral chromatic aberration characteristic comparable to that illustrated in FIG. 6B. Namely, this configuration is able to correct for the reduction of the lateral chromatic aberration on the projection plane.

According to the above correction configurations 9 to 16, the reflection type projection display apparatus 10B according to the second embodiment is composed of the wire grid polarizers 32 respectively for R, G, and B lights, the transparent glass plates 37 respectively for R, G, and B lights, the transmission type polarizing plates 38 respectively for R, G, and B lights, and the three-color combination cross dichroic prism (color-combination optical system) 40 on which the transmission type polarizing plates 38 are firmly fixed, all of which are arranged in this order along the light path, wherein any one of the light reflection surface of at least one of the wire grid polarizers 32 respectively for R, G, and B lights, the light transmission surface of at least one of the transparent glass plates 37 respectively for R, G, and B lights, and the light transmission surface of at least one of the transmission type polarizing plates 38 respectively for R, G, and B lights is convexly or concavely shaped in accordance with the lateral chromatic aberration characteristic of the projection lens 42 (FIGS. 18 and 19) in order to correct for the reduction of the lateral chromatic aberration of the image projected by the projection lens 42 (FIGS. 18 and 19) on the projection plane. Therefore, dimensions of the projected image created by at least one light can be so adjusted as to be the same as those of an image created by other lights, thereby correcting for the reduction of the lateral chromatic aberration on the projection plane.

A Third Embodiment

Figure 28:
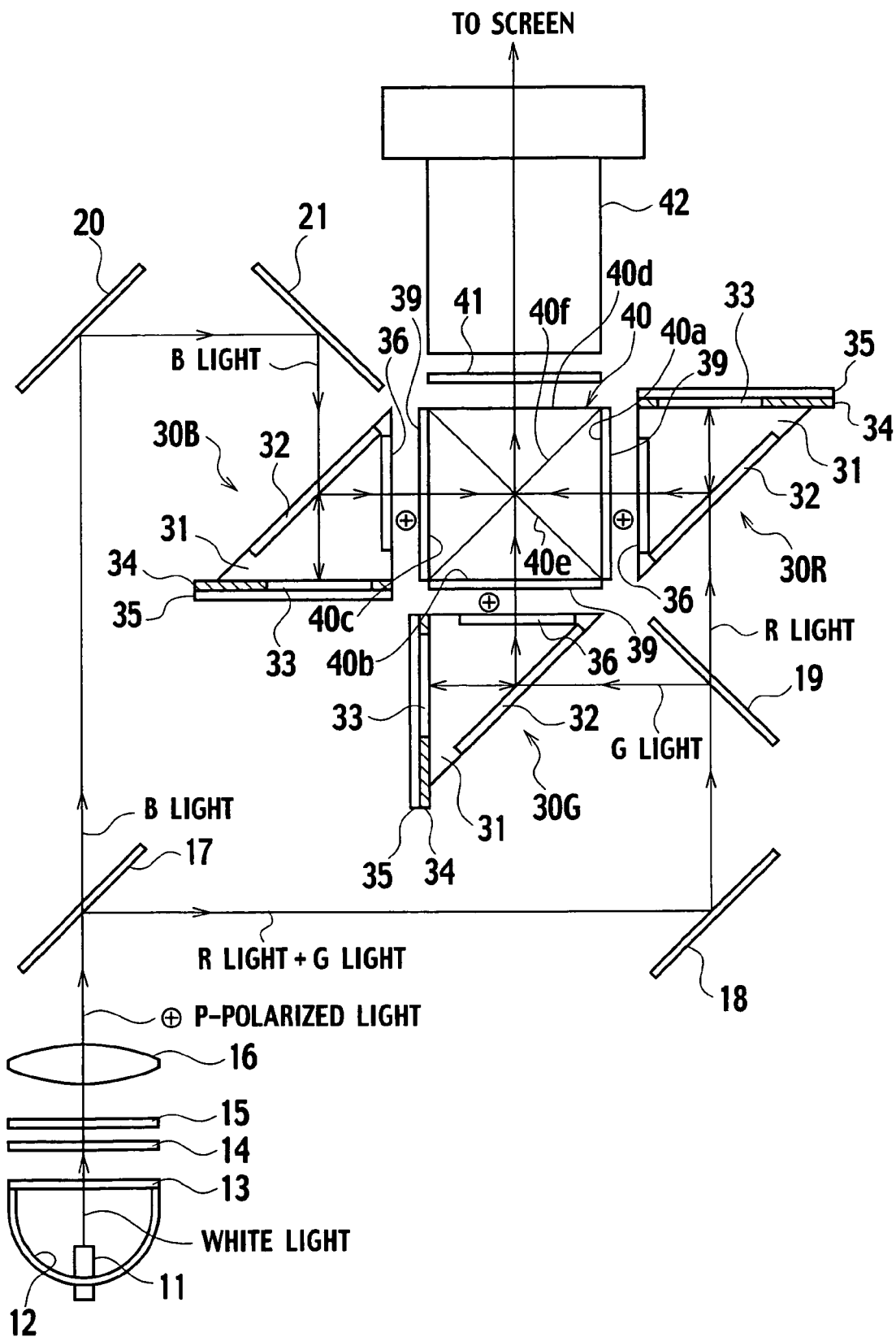
FIG. 28 is a plain view of a reflection type projection display apparatus according to a third embodiment of the present invention.
Figure 29:
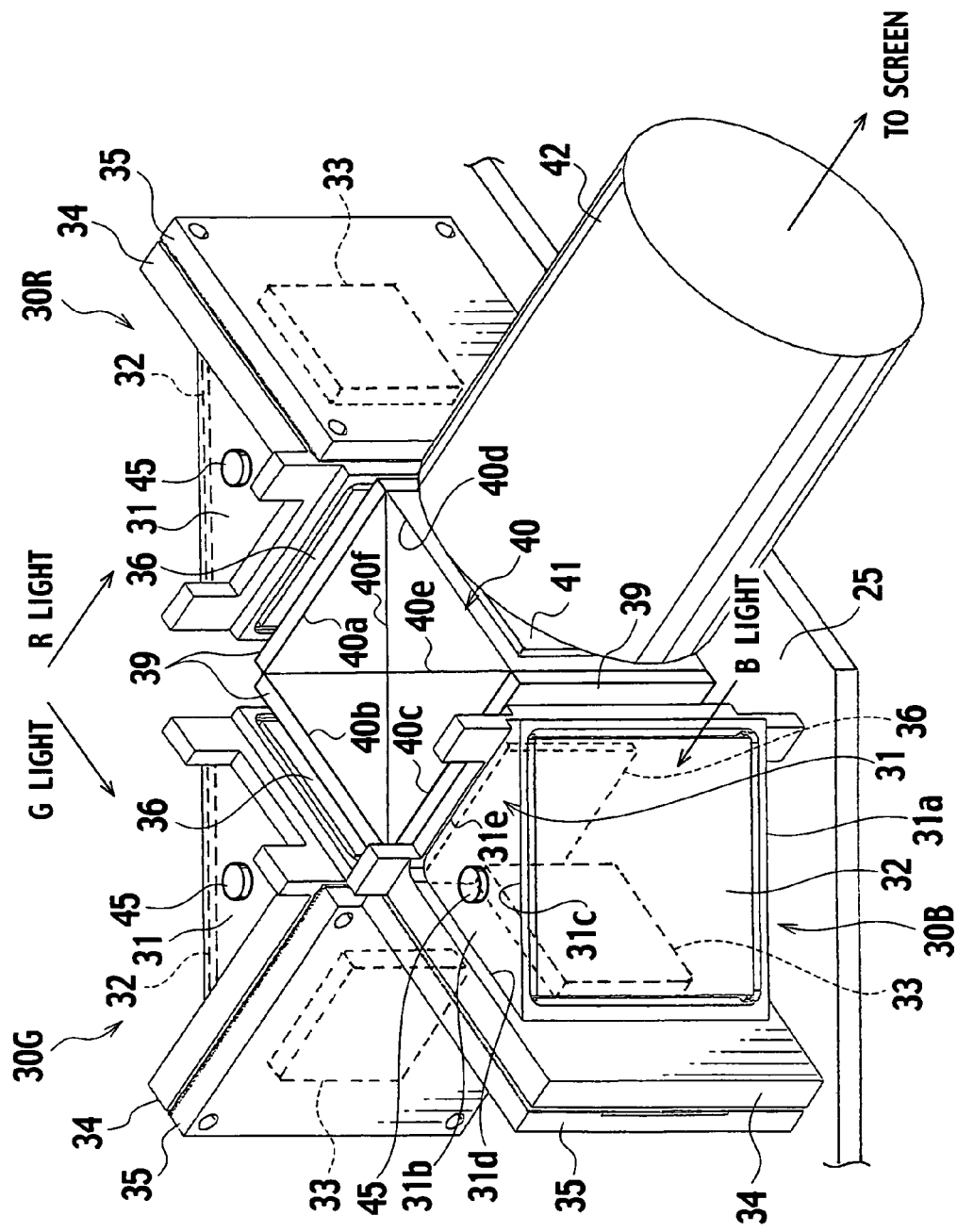
FIG. 29 is a perspective view of reflection type liquid crystal panel assemblies respectively for R, G, and B lights, a three-color combination cross dichroic prism, and a projection lens of the reflection type projection display apparatus according to the third embodiment, seen slantly upward from the reverse side of these components.

FIG. 28 is a plain view of a reflection type projection display apparatus according to a third embodiment of the present invention. FIG. 29 is a perspective view of reflection type liquid crystal panel assemblies respectively for R, G, and B lights, a three-color combination cross dichroic prism, and a projection lens of the reflection type projection display apparatus according to the third embodiment, seen slantly upward from the reverse side of these components.

As illustrated in FIGS. 28 and 29, in a projection display apparatus 10C according to a third embodiment of the present invention, reflection type liquid crystal panel assemblies respectively for R, G, and B lights are prepared in the same manner as the projection display apparatus 10A according to the first embodiment. Namely, in the reflection type liquid crystal panel assemblies respectively for R, G, and B lights, wire grid polarizers 32 respectively for R, G, and B lights are adhered by an adhesive on a first surface 31c of a right-angle triangular-based hollow column (referred to as a housing, hereinafter) 31; reflection type polarizing plates 36 respectively for R, G, and B lights are adhered by an adhesive on a second surface 31d of the housing 31 by use of an aperture mask plate 34; and transmission type polarizing plates 36 respectively for R, G, and B lights are adhered by an adhesive on a third surface 31e of the housing 31.

On the other hand, the projection display apparatus 10C is different from the projection display apparatus 10A according to the first embodiment in that transparent glass plates 39 respectively for R, G, and B lights are firmly fixed on incident surfaces 40a, 40b, 40c respectively for R, G, and B lights of a three-color combination cross dichroic prism 40 made of transparent optical glass, wherein the light transmission surface of at least one of the transparent glass plates 39 respectively for R, G, and B lights is convexly or concavely shaped as described in detail hereinafter, in order to correct for the reduction of the lateral chromatic aberration.

Therefore, in the projection display apparatus 10C according to the third embodiment, image lights for R, G, and B lights that have been produced and reflected by the reflection type liquid crystal panels 33 for R, G, and B lights are reflected by the wire grid polarizers 32 for R, G, and B lights to reach the transmission type polarizing plates 36 for R, G, and B lights. Next, only S polarization component passes through the transmission type polarizing plates 36 because polarization component except for S polarization component (that is, P polarization component) is excluded by the transmission type polarizing plates 36. Then, the image lights of R, G, and B colors having the S polarization pass through the transparent glass plates 39 for R, G, and B lights adhered respectively on the incident surfaces of the three-color combination cross dichroic prism 40 to reach the three-color combination cross dichroic prism 40 and thus color-combined.

Next, referring to FIGS. 30 to 33, there will be explained a configuration for correcting the reduction of the lateral chromatic aberrations of R, G, and B image lights on a projection plane such as a screen (not shown) in the reflection type projection display apparatus 10C according to the third embodiment, wherein the R, G, and B image lights that have been produced in accordance with image signals respectively for R, G, and B lights and reflected by the reflection type liquid crystal panels 33 respectively for R, G, and B lights proceed through the wire grid polarizer 32, the transmission type polarizing plate 36, and the transparent glass plates 39, and the three-color cross dichroic prism 40 in this order and then is projected by the projection lens 42 on the projection plane.

In the third embodiment, the transparent glass plate 39 firmly fixed respectively on incident surfaces 40a, 40b, 40c of the three-color combination cross dichroic prism 40 made of transparent optical glass (FIGS. 28 and 29) contributes to the optical correction for correcting for the reduction of the lateral chromatic aberration on the projection plane (screen), as described hereinafter.

When the transparent glass plate 39 is utilized to correct for the reduction of the lateral chromatic aberration, the light transmission surface of at least one of the transparent glass plates 39 respectively for R, G, and B lights has to be convexly or concavely shaped in accordance with the lateral chromatic aberration characteristic of the projection lens 42 (FIGS. 28 and 29) per the after-mentioned four correction configurations 17 to 20 (FIGS. 30 to 33). In this case, a convex light transmission surface thereof serves as a lens having a positive refracting power to the light transmitting therethrough and a concave light transmission surface thereof serves as a lens having a negative refracting power to the light transmitting therethrough.

By the way, in FIGS. 30 to 32, "r" represents a curvature radius and "f" represents a focus length. In this case, since the transparent glass 39 is adhered on the three-color combination cross dichroic prism 40, the light incident surface thereof is convexly or concavely shaped. Here, "+" and "−" signs in the focus length indicate a concave surface and a convex surface, respectively.

Figures 30A, 30B:
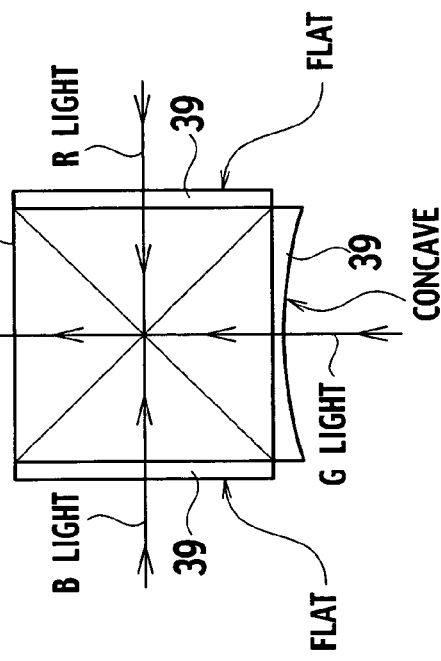
FIGS. 30A and 30B are an explanatory view of a correction configuration 17 that corrects the lateral chromatic aberration of the image on the projection plane using a transparent glass plate 39 in the third embodiment.

Specifically, as illustrated in FIGS. 30A and 30B, in the correction configuration 17, the transparent glass plate 39 for R light adhered on the three-color combination cross dichroic prism 40 has a flat light transmission surface (r=infinite); the transparent glass plate 39 for G light adhered on the three-color combination cross dichroic prism 40 has a concave light transmission surface having a curvature radius r of 8260 mm and a focus length f of −15930 mm, for example; and the transparent glass plate 39 for B light adhered on the three-color combination cross dichroic prism 40 has a flat light transmission surface (r=infinite), when the projection lens 42 (FIGS. 18 and 19) used has the aforementioned minus lateral chromatic aberration characteristic 1A illustrated in FIG. 6A. This configuration enables the center axis to be equivalently relocated between the lateral chromatic aberration curves for R and B lights in FIG. 6A, thereby realizing the lateral chromatic aberration characteristic comparable to that illustrated in FIG. 6B. Namely, this configuration is able to correct for the reduction of the lateral chromatic aberration on the projection plane.

Figures 31A, 31B:
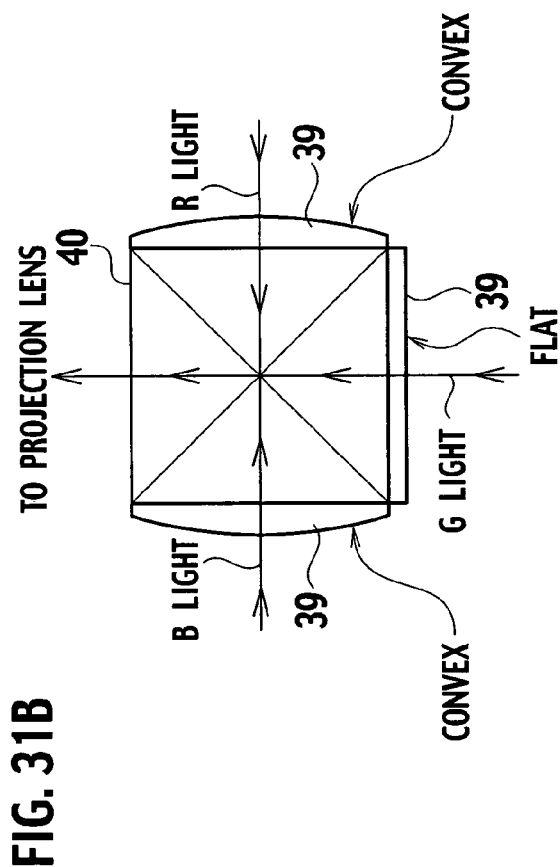
FIGS. 31A and 31B are an explanatory view of a correction configuration 18 that corrects the lateral chromatic aberration of the image on the projection plane using a transparent glass plate 39 in the third embodiment.

In addition, as illustrated in FIGS. 31A and 31B, in the correction configuration 18, the transparent glass plate 39 for R light has a convex light transmission surface having a curvature radius r of 9799 mm and a focus length f of +18898 mm, for example; the transparent glass plate 39 for G light has a flat light transmission surface (r=infinite); and the transparent glass plate 39 for B light has a convex light transmission surface having a curvature radius r of 6962 mm and a focus length f of +13427 mm, for example, when the projection lens 42 (FIGS. 28 and 29) used has the aforementioned lateral chromatic aberration characteristic 1A illustrated in FIG. 6A as is the case with the correction configuration 17. This configuration corrects the lateral chromatic aberrations of R and B lights without shifting the center axis, thereby realizing the lateral chromatic aberration characteristic comparable to that illustrated in FIG. 6B. Namely, this configuration is able to correct for the reduction of the lateral chromatic aberration on the projection plane.

Figures 32A, 32B:
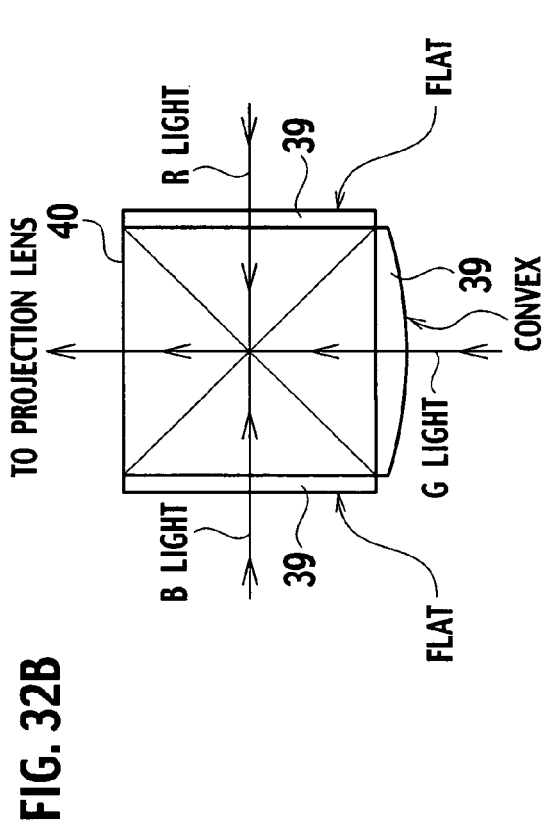
FIGS. 32A and 32B are an explanatory view of a correction configuration 19 that corrects the lateral chromatic aberration of the image on the projection plane using a transparent glass plate 39 in the third embodiment.

Additionally, as illustrated in FIGS. 32A and 32B, in the correction configuration 19, the transparent glass plate 39 for R light has a flat light transmission surface (r=infinite); the transparent glass plate 39 for G light has a convex light transmission surface having a curvature radius r of 8260 mm and a focus length f of +15930 mm, for example; and the transparent glass plate 39 for B light has a flat light transmission surface (r=infinite), when the projection lens 42 (FIGS. 28 and 29) used has the aforementioned plus lateral chromatic aberration characteristic 2A illustrated in FIG. 7A as is not the case with the above correction configuration 17. This configuration enables the center axis to be equivalently relocated between the lateral chromatic aberration curves for R and B lights in FIG. 7A, thereby realizing the lateral chromatic aberration characteristic comparable to that illustrated in FIG. 7B. Namely, this configuration is able to correct for the reduction of the lateral chromatic aberration on the projection plane.

Figures 33A, 33B:
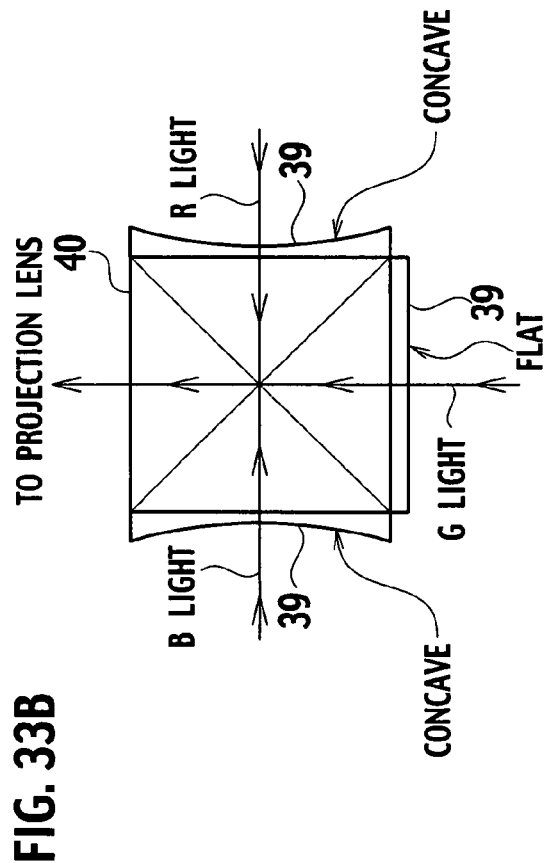
FIGS. 33A and 33B are an explanatory view of a correction configuration 20 that corrects the lateral chromatic aberration of the image on the projection plane using a transparent glass plate 39 in the third embodiment.

Moreover, as illustrated in FIGS. 33A and 33B, in the correction configuration 20, the transparent glass plate 39 for R light has a concave light transmission surface having a curvature radius r of 9799 mm and a focus length f of −18898 mm, for example; the transparent glass plate 39 for G light has a flat light transmission surface (r=infinite); and the transparent glass plate 37 for B light has a concave light transmission surface having a curvature radius r of 6962 mm and a focus length f of −13427 mm, for example, when the projection lens 42 (FIGS. 28 and 29) used has the aforementioned lateral chromatic aberration characteristic 2A illustrated in FIG. 7A as is the case with the correction configuration 19. This configuration corrects the lateral chromatic aberrations of R and B lights without shifting the center axis in FIG. 7A, thereby realizing the lateral chromatic aberration characteristic comparable to that illustrated in FIG. 7B. Namely, this configuration is able to correct for the reduction of the lateral chromatic aberration on the projection plane.

According to the correction configurations 17 to 20, the reflection type projection display apparatus 10C according to the third embodiment is composed of the wire grid polarizers 32 respectively for R, G, and B lights, the transmission type polarizing plates 36 respectively for R, G, and B lights, the transparent glass plates 39 respectively for R, G, and B lights, and the three-color combination cross dichroic prism (color-combination optical system) 40 on which the transparent glass plates 39 are firmly fixed, all of which are arranged in this order along the light path, wherein the light transmission surface of at least one of the transparent optical glasses 39 respectively for R, G, and B lights is convexly or concavely shaped in accordance with the lateral chromatic aberration characteristic of the projection lens 42 (FIGS. 28 and 29) in order to correct for the reduction of the lateral chromatic aberration of the image projected by the projection lens 42 (FIGS. 28 and 29) on the projection plane. Therefore, dimensions of the projected image created by at least one light having passed through such a light transmission surface is so adjusted as to be the same as those of a projected image created by other lights, thereby correcting for the reduction of the lateral chromatic aberration on the projection plane.

By the way, in the third embodiment, the light transmission surface of the transparent glass plate 39 firmly fixed on the incident surface of the three-color cross dichroic prism 40 is convexly or concavely shaped, thereby leading to a reduced production cost, when compared with the case where the wire grid polarizer 32 or the transmission type polarizing plate 36 having the convex or concave surface.

A Fourth Embodiment

Figure 34:
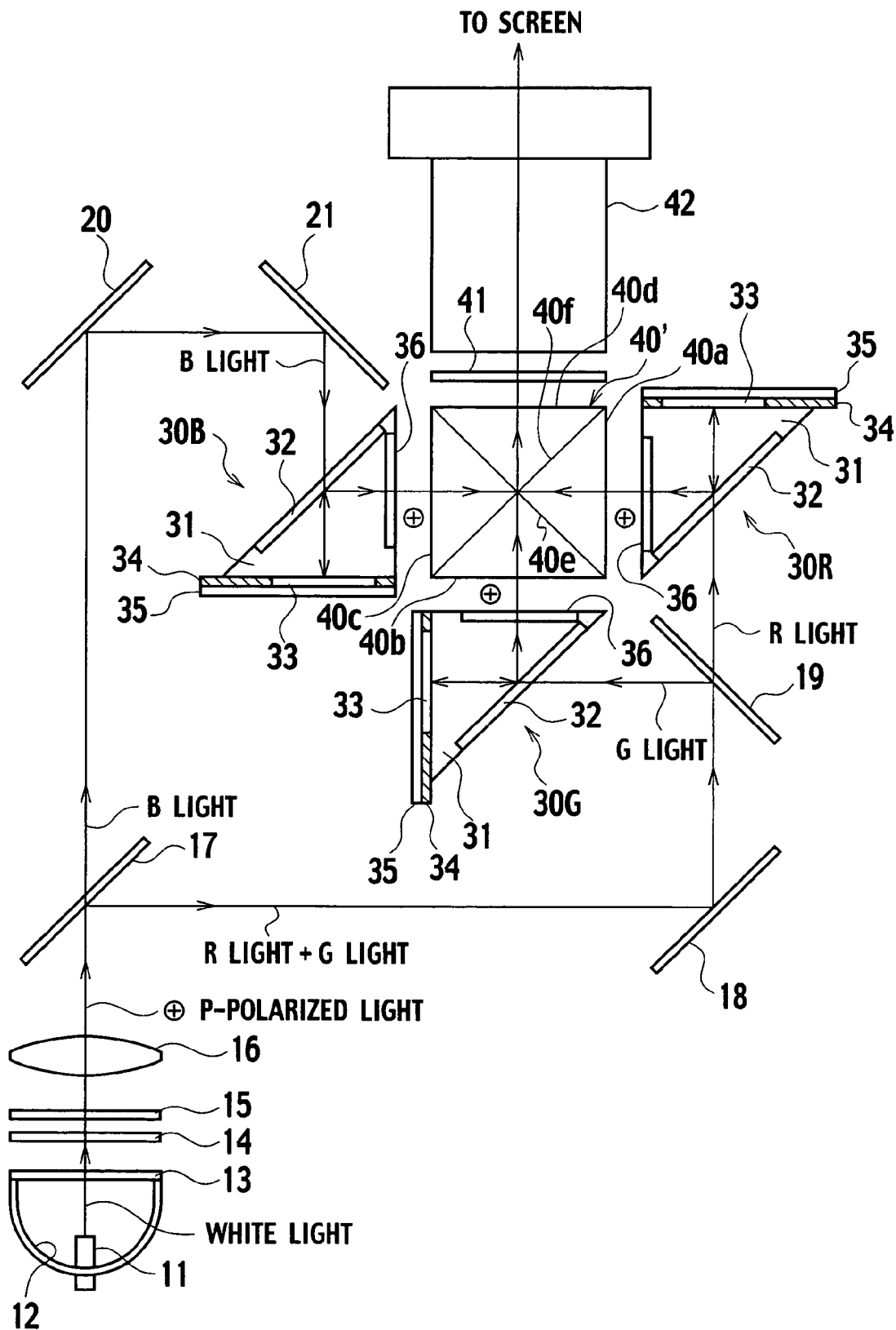
FIG. 34 is a plain view of a reflection type projection display apparatus according to a fourth embodiment of the present invention.
Figure 35:
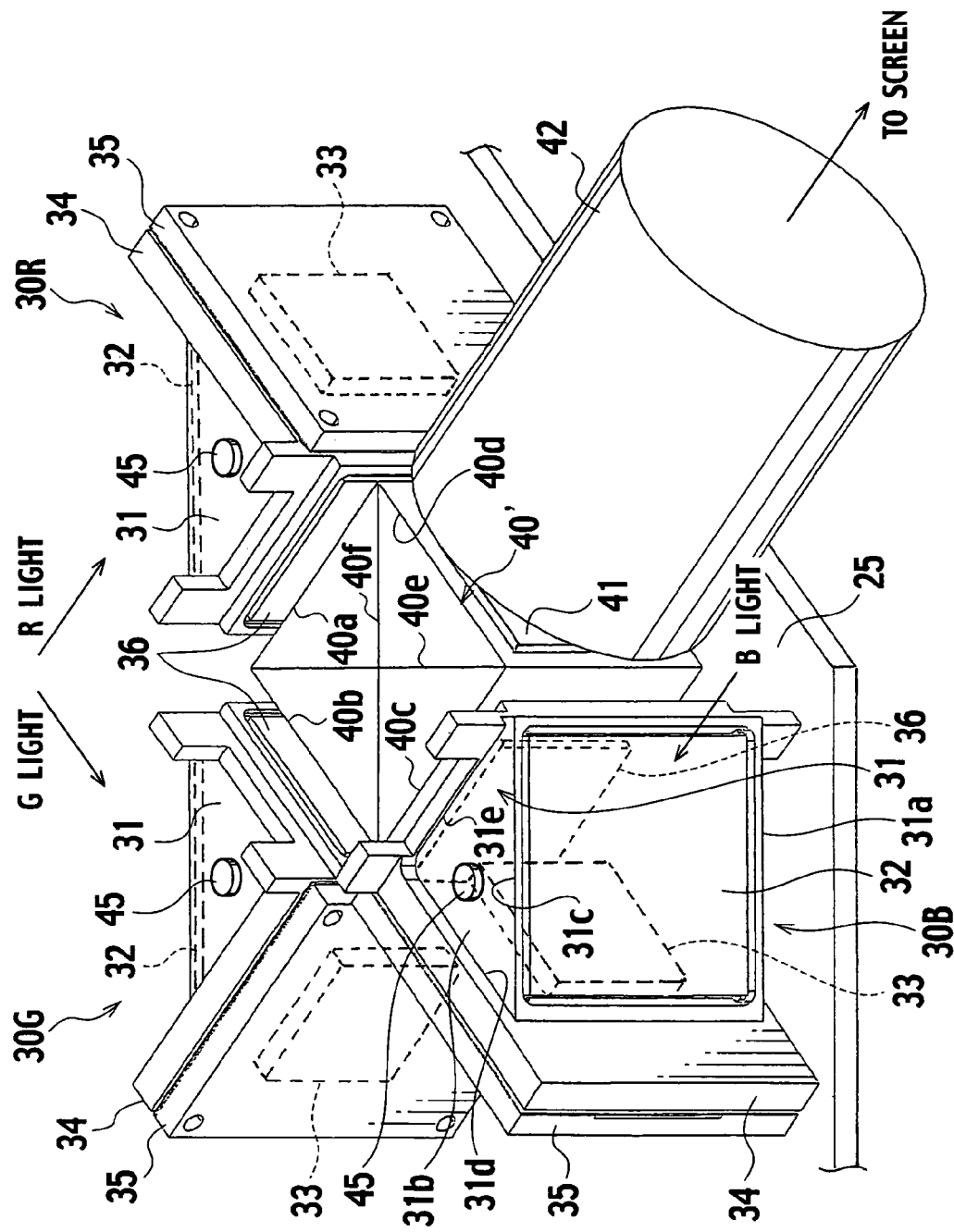
FIG. 35 is a perspective view of reflection type liquid crystal panel assemblies respectively for R, G, and B lights, a three-color combination cross dichroic prism, and a projection lens of the reflection type projection display apparatus illustrated in FIG. 34, seen slantly upward from the reverse side of these components.

FIG. 34 is a plain view of a reflection type projection display apparatus according to a fourth embodiment of the present invention. FIG. 35 is a perspective view of reflection type liquid crystal panel assemblies respectively for R, G, and B lights, a three-color combination cross dichroic prism, and a projection lens of the reflection type projection display apparatus illustrated in FIG. 34, seen slantly upward from the reverse side of these components.

As illustrated in FIGS. 34 and 35, a projection display apparatus 10D according to a fourth embodiment of the present invention is configured in the same manner as the projection display apparatus 10A according to the first embodiment. Namely, wire grid polarizers 32 respectively for R, G, and B lights are adhered by an adhesive on a first surface 31c of a right-angle triangular-based hollow column (housing) 31, which is prepared respectively for R, G, and B lights; reflection type polarizing plates 36 respectively for R, G, and B lights are adhered by an adhesive on a second surface 31d of the housing 31 by use of an aperture mask plate 34; and transmission type polarizing plates 36 respectively for R, G, and B lights are adhered by an adhesive on a third surface 31e of the housing 31.

However, the projection display apparatus 10D is different from the projection display apparatus 10A according to the first embodiment in that at least one of the three incident surfaces of the three-color combination cross dichroic prism 40' is convexly or concavely shaped when molding a transparent resin material to make the three-color combination cross dichroic prism 40' in order to correct for the reduction of the lateral chromatic aberration of the image projected on a projection plane by the projection lens 42 (FIGS. 34 and 35).

In the fourth embodiment, the R, G, and B image lights that have been produced and reflected by the reflection type liquid crystal panels 33 respectively for R, G, and B lights are then reflected by the wire gird polarizers 32 respectively for R, G, and B lights to reach the transmission type polarizing plates 36 for R, G, and B lights. When the R, G, and B image lights pass through the corresponding transmission type polarizing plate 36, unwanted polarization component (P polarization component) is excluded and only S polarization component exits therefrom. Then, the R, G, and B image lights of S polarization are color-combined by the three-color cross dichroic prism 40' made of resin.

Next, referring to FIGS. 36 to 39, there will be explained a configuration that corrects for the reduction of the lateral chromatic aberration of the R, G, and B image light to be projected on a projection plane such as a screen (not shown) in the reflection type projection display apparatus 10D according to the fourth embodiment, wherein the R, G, and B image lights that have been produced in accordance with image signals respectively for R, G, and B lights and reflected by the reflection type liquid crystal panels 33 respectively for R, G, and B lights proceed through the wire grid polarizer 32, the transmission type polarizing plates 36, and the three-color cross dichroic prism 40 made of resin in this order and is projected by the projection lens 42 on the projection plane.

In the fourth embodiment, incident surfaces 40a, 40b, 40c of the three-color combination cross dichroic prism 40' made of resin (FIGS. 34 and 35) contribute to the optical correction for correcting the reduction of the lateral chromatic aberration on the projection plane (screen), as described hereinafter.

When the three-color combination cross dichroic prism 40 is utilized to correct for the reduction of the lateral chromatic aberration, at least one of the light incident surfaces 40a, 40b, 40c respectively for R, G, and B lights has to be convexly or concavely shaped in accordance with the lateral chromatic aberration characteristic of the projection lens 42 (FIGS. 28 and 29) per the after-mentioned four correction configurations 21 to 24 (FIGS. 30 to 33). In this case, a convex light incident surface thereof serves as a lens having a positive refracting power to the light transmitting therethrough and a concave light incident surface thereof serves as a lens having a negative refracting power to the light transmitting therethrough. By the way, in FIGS. 36 to 39, "r" represents a curvature radius and "f" represents a focus length. Here, "+" and "−" signs in the focus length indicate a concave surface and a convex surface, respectively.

Specifically, as illustrated in FIGS. 36A and 36B, in the correction configuration 21, the incident surface 40a for R light of the three-color combination cross dichroic prism 40' is flat (r=infinite); the incident surface 40b for G light of the three-color combination cross dichroic prism 40' is concavely shaped so as to have a curvature radius r of 8260 mm and a focus length f of −15930 mm, for example; and the incident surface 40c for B light of the three-color combination cross dichroic prism 40' is flat (r=infinite), when the projection lens 42 (FIGS. 34 and 35) used has the aforementioned minus lateral chromatic aberration characteristic 1A illustrated in FIG. 6A. This configuration enables the center axis to be equivalently relocated between the lateral chromatic aberration curves for R and B lights in FIG. 6A, thereby realizing the lateral chromatic aberration characteristic comparable to that illustrated in FIG. 6B. Namely, this configuration is able to correct for the reduction of the lateral chromatic aberration on the projection plane.

In addition, as illustrated in FIGS. 37A and 37B, in the correction configuration 22, the incident surface 40a for R light of the three-color combination cross dichroic prism 40' is convexly shaped so as to have a curvature radius r of 9799 mm and a focus length f of +18898 mm, for example; the incident surface 40b for G light of the three-color combination cross dichroic prism 40' is flat (r=infinite); and the incident surface 40c for B light of the three-color combination cross dichroic prism 40' is convexly shaped so as to have a curvature radius r of 6962 mm and a focus length f of +13427 mm, for example, when the projection lens 42 (FIGS. 34 and 35) used has the aforementioned lateral chromatic aberration characteristic 1A illustrated in FIG. 6A, as is the case with the correction configuration 21. This configuration corrects the lateral chromatic aberration characteristics for R and B lights without shifting the center axis in FIG. 6A, thereby realizing the lateral chromatic aberration characteristic comparable to that illustrated in FIG. 6B. Namely, this configuration is able to correct for the reduction of the lateral chromatic aberration on the projection plane.

Figures 38A, 38B:
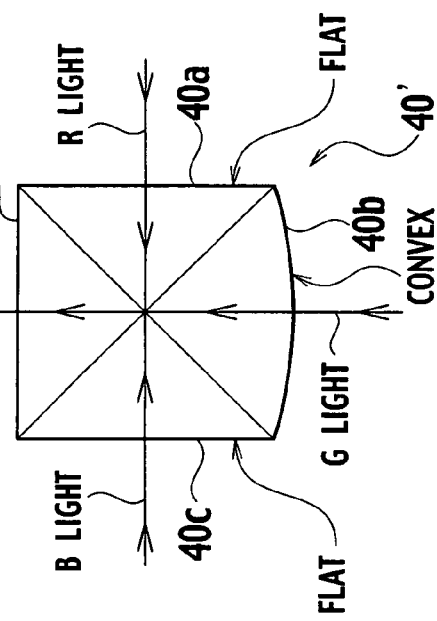
FIGS. 38A and 38B are an explanatory view of a correction configuration 23 that corrects the lateral chromatic aberration of the image on the projection plane using a three-color combination cross dichroic prism 40' made of a resin in the fourth embodiment.

Additionally, as illustrated in FIGS. 38A and 38B, in the correction configuration 23, the incident surface 40a for R light of the three-color combination cross dichroic prism 40' is flat (r=infinite); the incident surface 40b for G light of the three-color combination cross dichroic prism 40' is convexly shaped so as to have a curvature radius r of 8260 mm and a focus length f of +15930 mm, for example; and the incident surface 40c for B light of the three-color combination cross dichroic prism 40' is flat (r=infinite), when the projection lens 42 (FIGS. 34 and 35) used has the aforementioned plus lateral chromatic aberration characteristic 2A illustrated in FIG. 7A, as is not the case with the correction configurations 21 and 22. This configuration enables the center axis to be equivalently relocated between the lateral chromatic aberration curves for R and B lights in FIG. 7A, thereby realizing the lateral chromatic aberration characteristic comparable to that illustrated in FIG. 7B. Namely, this configuration is able to correct for the reduction of the lateral chromatic aberration on the projection plane.

Figures 39A, 39B:
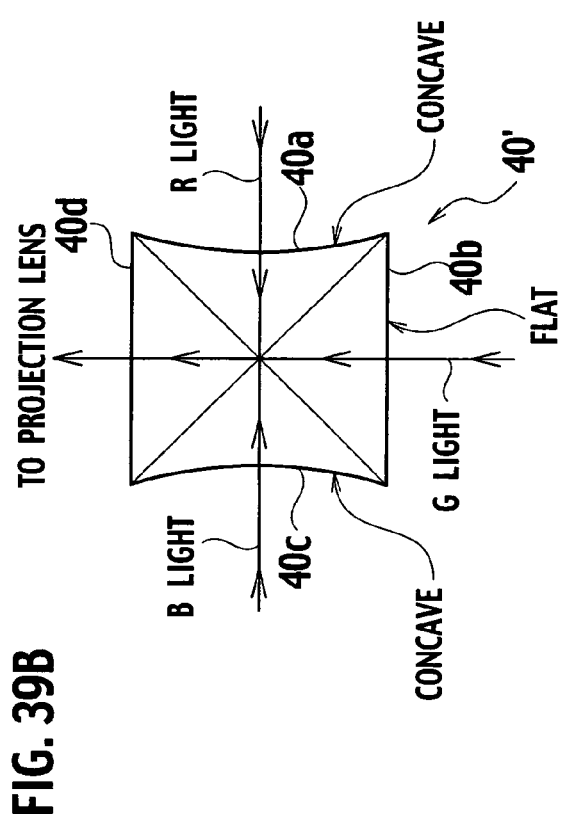
FIGS. 39A and 39B are an explanatory view of a correction configuration 24 that corrects the lateral chromatic aberration of the image on the projection plane using a three-color combination cross dichroic prism 40' made of a resin in the fourth embodiment.

Moreover, as illustrated in FIGS. 39A and 39B, in the correction configuration 24, the incident surface 40a for R light of the three-color combination cross dichroic prism 40' is concavely shaped so as to have a curvature radius r of 9799 mm and a focus length f of −18898 mm, for example; the incident surface 40b for G light of the three-color combination cross dichroic prism 40' is flat (r=infinite); and the incident surface 40c for B light of the three-color combination cross dichroic prism 40' is concavely shaped so as to have a curvature radius r of 6962 mm and a focus length f of −13427 mm, for example, when the projection lens 42 (FIGS. 34 and 35) used has the aforementioned lateral chromatic aberration characteristic 2A illustrated in FIG. 7A, as is the case with the correction configuration 23. This configuration corrects the lateral chromatic aberrations of R and B lights without shifting the center axis, thereby realizing the lateral chromatic aberration characteristic comparable to that illustrated in FIG. 6B. Namely, this configuration is able to correct for the reduction of the lateral chromatic aberration on the projection plane.

According to the correction configurations 21 to 24, in the reflection type projection display apparatus 10C according to the fourth embodiment, at least one of the incident surfaces 40a, 40b, 40c respectively for R, G, and B lights of the three-color cross dichroic prism 40' is convexly or concavely shaped in accordance with the lateral chromatic aberration of the projection lens 42 (FIGS. 34 and 35), thereby adjusting dimensions of the projected image created by at least one light having passed through such a incident surface to be the same as those of a projected image created by other lights. Therefore, it is possible to correct for the reduction of the lateral chromatic aberration on the projection plane.

When the three-color combination cross dichroic prism 40' is made by mold-processing using a transparent resin, it is easy to make any one of the light incident surfaces of the resin-made three-color combination cross dichroic prism 40' to be convex or concave.

By the way, while the fourth embodiment has described the three-color combination cross dichroic prism 40' made of a transparent resin material, the three-color combination cross dichroic prism 40' can be made of transparent optical glass as is the case with the three-color combination cross dichroic prism 40 (FIGS. 3 and 4). Even in this case, aforementioned correction configurations 21 to 24 are possibly applied to the three-color combination cross dichroic prism 40, although it is rather difficult to make any one of the incident surfaces of the three-color combination cross dichroic prism 40 made of optical grade glass to be convexly or concavely shaped, because the incident surface is only realized by polishing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflection projection display apparatus, comprising:
reflection spatial light modulation elements provided respectively for red, green and blue light,
illumination units for radiating red, green and blue light respectively on said reflection spatial light modulation elements,
wire grid polarizers provided respectively for red, green and blue light, and arranged inclined at an angle of 45 degrees in relation to a respective optical axis of red, green and blue light from said illumination units, said wire grid polarizers each allowing a first polarization component included in the red, green, or blue light from said illumination units to pass therethrough and reflecting second polarization components of red, green and blue colors that have been produced when said reflection spatial light modulation elements respectively for red, green and blue light light-modulate and reflect the first polarization component having once passed through said wire grid polarizers respectively for red, green and blue light,
transmission polarizing plates provided respectively for red, green and blue light, and arranged to intersect a respective optical axis of the second polarization components of red, green and blue colors that have been reflected by said wire grid polarizers respectively for red, green and blue light, said transmission polarizing plates excluding unwanted polarization component that has been reflected by said wire grid polarizer along with the second polarization components, thereby allowing the second polarization components of red, green and blue colors to pass therethrough,
a right-angle triangular-based hollow housing provided respectively for red, green, and blue light, the right-angle triangular-based housing having a lower plane and an upper plane, both of which are formed into a shape of a right-angle triangle, and a first surface, a second surface, and a third surface, all of which are formed into a shape of a rectangle and connect the lower plane and the upper plane, the first surface having the wire grid polarizer attached, the second surface having the reflection spatial light modulation element attached, and the third surface having the transmission polarizing plate attached, a color combination optical system that has light incident surfaces for allowing to enter therein the respective second polarization component of red, green or blue color that has passed through respective said transmission polarizing plates and color-combines to produce color-combined light to be projected, and a projection lens for projecting the color-combined light, wherein any one of the light reflection surface of at least one of said wire grid polarizers respectively for red, green and blue light, the light transmission surface of at least one of said transmission polarizing plates for red, green and blue light, and at least one of the light incident surfaces of said color combination optical system is convexly or concavely shaped in accordance with lateral chromatic aberration of said projection lens, thereby correcting for the reduction of the lateral chromatic aberration of the image projected on a projection plane by said projection lens.

2. A reflection projection display apparatus as recited in claim 1, wherein said color combination optical system is made of a transparent resin material when at least one of the light incident surfaces respectively for red, green and blue light thereof is convexly or concavely shaped in accordance with the lateral chromatic aberration of said projection lens.

3. A reflection projection display apparatus, comprising:

reflection spatial light modulation elements provided respectively for red, green and blue light, illumination units for radiating red, green and blue light respectively on said reflection spatial light modulation elements, wire grid polarizers provided respectively for red, green and blue light, and arranged inclined at an angle of 45 degrees in relation to a respective optical axis of red, green and blue light from said illumination units, said wire grid polarizers each allowing a first polarization component included in the red, green, or blue light from said illumination units to pass therethrough and reflecting second polarization components of red, green and blue colors that have been produced when said reflection spatial light modulation elements respectively for red, green and blue light light-modulate and reflect the first polarization component having once passed through said wire grid polarizers respectively for red, green and blue light, transparent glass plates provided respectively for red, green and blue light, and arranged to intersect a respective optical axis of the second polarization components of red, green and blue colors that have been reflected by said wire grid polarizers respectively for red, green and blue light, said transparent glass plates allowing to pass therethrough the second polarization components of red, green and blue colors that have been reflected by said wire grid polarizers respectively for red, green and blue light, a right-angle triangular-based hollow housing provided respectively for red, green, and blue light, the right-angle triangular-based housing having a lower plane and an upper plane, both of which are formed into a shape of a right-angle triangle, and a first surface, a second surface, and a third surface, all of which are formed into a shape of a rectangle and connect the lower plane and the upper plane, the first surface having the wire grid polarizer attached, the second surface having the reflection spatial light modulation element attached, and the third surface having the transparent glass plate attached, a color combination optical system that has light incident surfaces for allowing to enter therein the respective second polarization component of red, green, or blue color having passed through respective said transparent glass plate, said light incident surfaces each being provided thereon with a transmission polarizing plate that excludes unwanted polarization component included in the light having passed through said transparent glass plate along with the second polarization components, thereby allowing the second polarization components to exit therethrough, and color-combines the second polarization components of red, green and blue colors having passed through respective said transparent glass plates to produce color-combined light to be projected, and a projection lens for projecting the color-combined light, wherein any one of the light reflection surface of at least one of said wire grid polarizers respectively for red, green and blue light, the light transmission surface of at least one of said transparent glass plates respectively for red, green and blue light, and the light transmission surface of at least one of said transmission polarizing plates respectively for red, green and blue light is convexly or concavely shaped in accordance with lateral chromatic aberration of said projection lens, thereby correcting for the reduction of the lateral chromatic aberration of the image projected on a projection plane by said projection lens.

4. A reflection projection display apparatus, comprising:

reflection spatial light modulation elements provided respectively for red, green and blue light, illumination units for radiating red, green and blue light respectively on said reflection spatial light modulation elements, wire grid polarizers provided respectively for red, green and blue light, and arranged inclined at an angle of 45 degrees in relation to a respective optical axis of red, green and blue light from said illumination units, said wire grid polarizers each allowing a first polarization component included in the red, green, or blue light from said illumination units to pass therethrough and reflecting second polarization components of red, green and blue colors that have been produced when said reflection spatial light modulation elements respectively for red, green and blue light light-modulate and reflect the first polarization component having once passed through said wire grid polarizers respectively for red, green and blue light, transmission polarizing plates provided respectively for red, green and blue light, and arranged to intersect a respective optical axis of the second polarization components of red, green and blue colors that have been reflected by said wire grid polarizers respectively for red, green and blue light, said transmission polarizing plates excluding unwanted polarization component that has been reflected by said wire grid polarizer along with the second polarization components, thereby allowing the second polarization components of red, green and blue colors to pass therethrough, a right-angle triangular-based hollow housing provided respectively for red, green, and blue light, the right-angle triangular-based housing having a lower plane and an upper plane, both of which are formed into a shape of a right-angle triangle, and a first surface, a second surface, and a third surface, all of which are formed into a shape of a rectangle and connect the lower plane and the upper plane, the first surface having the wire grid polarizer attached, the second surface having the reflection spatial light modulation element attached, and the third surface having the transmission polarizing plate attached, a color combination optical system that has light incident surfaces for allowing to enter therein the respective second polarization component of red, green, or blue color having passed through respective said transmission polarizing plates, said light incident surfaces each being provided thereon with a transparent glass plate for allowing the second polarization components to pass therethrough, and color-combines the second polarization components of the red, green and blue colors having passed through respective said transparent glass plates to produce color-combined light to be projected, and a projection lens for projecting the color-combined light, wherein the light transmission plate of at least one of said transparent glass plates respectively for red, green and blue light is convexly or concavely shaped in accordance with the lateral chromatic aberration of said projection lens, thereby correcting for the reduction of the lateral chromatic aberration of the image projected on a projection plane by said projection lens.

* * * * *